US011351667B2

(12) United States Patent
Junkersdorf et al.

(10) Patent No.: US 11,351,667 B2
(45) Date of Patent: Jun. 7, 2022

(54) TOOL BASIC MODULE

(71) Applicant: Robert Bosch GmbH, Stuttgart (DE)

(72) Inventors: Pascal Junkersdorf, Stuttgart (DE); Istvan Szell, Leinfelden-Echterdingen (DE); Thomas Hampel, Magstadt (DE); Asmir Rojo, Unterensingen (DE); Timo Etzel, Neuhausen A.D.F. (DE); Juergen Gairing, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 636 days.

(21) Appl. No.: 16/062,979

(22) PCT Filed: Dec. 16, 2016

(86) PCT No.: PCT/EP2016/081408
§ 371 (c)(1),
(2) Date: Jun. 15, 2018

(87) PCT Pub. No.: WO2017/103095
PCT Pub. Date: Jun. 22, 2017

(65) Prior Publication Data
US 2018/0361556 A1 Dec. 20, 2018

(30) Foreign Application Priority Data

Dec. 16, 2015 (DE) ...................... 10 2015 225 489.5
Dec. 15, 2016 (DE) ...................... 10 2016 225 114.7

(51) Int. Cl.
*B25F 3/00* (2006.01)
*B25F 5/00* (2006.01)
(Continued)

(52) U.S. Cl.
CPC ................ *B25F 3/00* (2013.01); *B25F 5/001* (2013.01); *B25F 5/02* (2013.01); *B23D 45/16* (2013.01);
(Continued)

(58) Field of Classification Search
CPC ... B25F 3/00; B25F 5/001; B25F 5/02; B23D 45/16; B25B 21/00; H01M 10/0525; H01M 10/46
(Continued)

(56) References Cited

U.S. PATENT DOCUMENTS 3,952,239 A    4/1976  Owings et al.
5,186,639 A *  2/1993  Comerci ............ H01R 13/7035
                                                    200/51.09
(Continued)

FOREIGN PATENT DOCUMENTS

CN   1138512 A   12/1996
CN   1191917 C    3/2005
(Continued)

OTHER PUBLICATIONS

International Search Report corresponding to PCT Application No. PCT/EP2016/081408, dated Mar. 27, 2017 (German and English language document) (7 pages).

*Primary Examiner* — Michelle Lopez
(74) *Attorney, Agent, or Firm* — Maginot, Moore & Beck LLP

(57) ABSTRACT

A tool basic module, in particular for a stand-alone use, includes a drive unit, a main output, and a coupling device. The coupling device includes a mechanical interface and an electrical interface. The mechanical interface is configured to establish a mechanical drive connection between the main output and at least one attachment device. The electrical interface transmits at least one of a high power and a high current, and is configured to establish an electrical connection between the at least one attachment device and the main output. The electrical connection is coupled to the mechanical connection.

21 Claims, 15 Drawing Sheets

(51) Int. Cl.
*B25F 5/02* (2006.01)
*B23D 45/16* (2006.01)
*B25B 21/00* (2006.01)
*H01M 10/0525* (2010.01)
*H01M 10/46* (2006.01)

(52) U.S. Cl.
CPC ......... *B25B 21/00* (2013.01); *H01M 10/0525* (2013.01); *H01M 10/46* (2013.01)

(58) Field of Classification Search
USPC ........................................................ 173/29
See application file for complete search history.

(56) References Cited

U.S. PATENT DOCUMENTS

| | | | | |
|---|---|---|---|---|
| 5,320,560 | A * | 6/1994 | Fladung | H01R 13/717 |
| | | | | 439/490 |
| 6,181,032 | B1 * | 1/2001 | Marshall | H01M 2/1022 |
| | | | | 307/150 |
| 9,776,315 | B2 * | 10/2017 | Cannaliato | B25F 3/00 |
| 2004/0188119 | A1 | 9/2004 | Chen | |
| 2010/0288520 | A1 | 11/2010 | Dayton et al. | |
| 2012/0210585 | A1 | 8/2012 | Gieske et al. | |
| 2013/0008677 | A1 | 1/2013 | Huifu | |
| 2013/0118767 | A1 * | 5/2013 | Cannaliato | B25F 5/021 |
| | | | | 173/29 |

FOREIGN PATENT DOCUMENTS

| | | | | |
|---|---|---|---|---|
| CN | 102858484 A | | 1/2013 | |
| CN | 203156712 U | | 8/2013 | |
| DE | 10 2014 205 555 A1 | | 10/2014 | |
| DE | 102014205555 A1 * | | 10/2014 | ............. B25F 3/00 |
| EP | 1 075 906 A2 | | 2/2001 | |
| EP | 2 177 322 A1 | | 10/2008 | |
| EP | 2 668 913 A2 | | 5/2013 | |
| WO | 2011/103636 A1 | | 9/2011 | |
| WO | 2013/070937 A2 | | 5/2013 | |

* cited by examiner

TOOL BASIC MODULE

This application is a 35 U.S.C. § 371 National Stage Application of PCT/EP2016/081408, filed on Dec. 16, 2016, which claims the benefit of priority to Serial No. DE 10 2015 225 489.5, filed on Dec. 16, 2015 in Germany, and which claims the benefit of priority to Serial No. DE 10 2016 225 114.7, filed on Dec. 15, 2016 in Germany, the disclosures of which are incorporated herein by reference in their entirety.

BACKGROUND

A tool basic module, in particular for independent use, with a drive unit, with a main output and with a coupling device which has a mechanical interface for a mechanical drive connection of at least one attachment device to the main output, has already been proposed.

SUMMARY

The disclosure is based on a tool basic module, in particular for independent use, with a drive unit, with a main output and with a coupling device which has a mechanical interface for a mechanical drive connection of at least one attachment device to the main output.

It is proposed that the coupling device has an electrical interface for transmitting a high power and/or a high current, and which is provided for an electrical connection, coupled to the mechanical connection, of the at least one attachment device to the main output.

A tool basic module which can be used in a particularly versatile manner can thereby be provided. Attachment devices with electrical additional functions can be used. Resources, such as, for example, an energy supply of the tool basic module, can be used particularly economically. An additional energy supply for the attachment device can be saved. A high degree of user convenience can be achieved. Within this context, a "tool basic module" is intended to be understood as meaning in particular a portable power tool. A "portable power tool" is intended to be understood as meaning, in this context, in particular a workpiece-processing, hand-guided machine, but advantageously a battery-powered portable power tool, a screwdriver, in particular a battery-powered screwdriver, a battery-powered electric screwdriver, a drill, a hammer drill and/or percussion hammer, a saw, a planer, a mortiser, a grinder, an angle grinder, a gardening implement and/or a multifunctional tool. A workpiece-processing, hand-guided machine here is a hand-guided machine for processing a workpiece. In this context, an "independent use" is intended to be understood as meaning in particular a use independently of the attachment device, in particular on its own, for example for screwing, drilling, grinding and/or stirring. In particular, the tool basic module is usable as such without an attachment device. The attachment device is preferably provided in conjunction with the tool basic module for a use which is different from a use of the tool basic module by itself. In this context, a "main output" is intended to be understood as meaning in particular an output of a main output train of the tool basic module, in particular for transmitting a torque and/or a rotational movement. The main output is preferably formed by an output shaft, in particular by a free end of an output shaft. For transmitting a torque and/or a rotational movement to the attachment device, the main output has in particular a polygonal cross section. The polygonal cross section serves for non-rotatably connecting the main output to the attachment device. The main output can have in particular an output shaft with a tool holder for receiving an insertion tool. In particular, in at least one operating state, the drive unit provides a torque for driving the output shaft. In particular, the output shaft is provided for driving the tool holder. The main output preferably has a main output axis which is defined, for example, by an axis of rotation of the output shaft. The tool holder is preferably designed as a plug-in and/or latching holder. The tool holder preferably has a recess with a polygonal cross section for receiving the insertion tool, such as, for example, a screwdriver bit, a brush or a stirrer. The recess is preferably in the form of a hexagon socket. It is conceivable for the tool holder to have a locking sleeve. It is also conceivable for the tool holder to be provided for receiving and/or securing an insertion tool without a locking sleeve. During an "independent use" of the tool basic module, the main output is designed as a tool holder for releasably receiving an insertion tool and serves for transmitting torque to the insertion tool. The tool basic module is usable independently here without an attachment device with the use of an insertion tool. Alternatively to an independent use, the tool basic module can also be provided for use with an attachment device. In this case, torque is transmitted from the main output to the attachment device. For use of the tool basic module with the attachment device, the tool basic module has a coupling device with a mechanical interface.

In addition to the drive unit and the main output and also the coupling device, the tool basic module in particular also comprises a gearing unit. The gearing unit is designed in particular to adapt, in particular to reduce, a rotational speed of the drive unit. The gearing unit is designed in particular as a reduction gearing unit with which the rotational speed of the drive unit is adapted to a lower rotational speed of the main output of the tool basic module. In particular, in at least one operating state, the drive unit provides a torque for driving the output shaft. The main output axis is preferably oriented at least substantially parallel to a main working direction of the tool basic module. "At least substantially parallel" is intended to be understood here as meaning in particular an orientation of a direction relative to a reference direction, in particular in a plane, wherein the direction has a deviation of in particular smaller than 8 degrees, advantageously smaller than 5 degrees and particularly advantageously smaller than 2 degrees in relation to the reference direction. The expression "at least substantially perpendicularly" is intended here to define in particular an orientation of a direction relative to a reference direction, wherein the direction and the reference direction enclose an angle, in particular as viewed in a plane, which deviates in particular by less than 8 degrees, advantageously less than 5 degrees and particularly advantageously less than 2 degrees from 90 degrees. Directional details such as "axially", "radially" and "in the circumferential direction" are intended to be understood as meaning in particular with respect to a direction of the main output axis. "Axially" is intended to be understood here as meaning in particular in the direction of the main output axis. "Radially" is intended to be understood as meaning outward perpendicularly to the main output axis along a straight line which intersects the main output axis. "In the circumferential direction" is intended to be understood as meaning along a circle in a plane perpendicular to the main output axis. In this context, a "coupling device" is intended to be understood as meaning in particular a device which is provided to connect a housing of the tool basic module releasably, in particular releasably without a tool, to a housing of the attachment device. The coupling device brings about a releasably, in particular releasably without a tool, electrical and mechanical connection of the attachment device to the tool basic module. For this purpose, the coupling device has a mechanical interface. The mechanical interface is designed to bring about a mechanical drive connection of the attachment device to the main output. In particular, the mechanical interface brings about a transmission of torque from the main output to the attachment device. The coupling device furthermore in particular has a locking unit to which the housing of the tool basic module is connectable mechanically in a releasable manner, in particular mechanically in a releasable manner without a tool, to the housing of the attachment device. The locking unit in particular brings about an axial securing and/or a rotational securing of the housing of the attachment device to the housing of the tool basic module. For this purpose, the locking unit has at least one securing element for the axial securing and/or rotational securing. The locking unit can have, for example, one or more securing elements which bring about both an axial securing and a rotational securing. Alternatively, the locking unit can have one or more securing elements which bring about an axial securing or a rotational securing. In the case of a locking unit of this type, at least one securing element is provided for the axial securing and at least one securing element is provided for the rotational securing. The securing element for the axial securing and the securing element for the rotational securing are designed differently from each other. The at least one securing element for the axial securing and/or rotational securing can be designed in particular as a force-fitting and/or form-fitting securing element. The locking unit furthermore in particular has an unlocking element. The unlocking element is provided in particular to release the locking of the attachment device to the housing of the tool basic module. The unlocking element is in particular actuable manually by the user. The unlocking element is designed by way of example as a rotatably mounted unlocking ring. The unlocking element is preferably provided on the attachment device. Alternatively, the unlocking element can also be present on the housing of the tool basic module.

The coupling device furthermore has at least one electrical interface. The electrical interface is configured in particular to transmit a high power and/or a high current. The electrical interface is also referred to below as a power interface. In this context, a "high power" is intended to be understood as meaning in particular a power of at least 20 W, preferably a power of at least 40 W, preferably a power of at least 60 W and particularly preferably a power of at least 80 W. A "coupled connection" to the mechanical connection is intended to be understood in this context as meaning in particular a connection closing at least substantially simultaneously with the mechanical connection. The mechanical connection and the electrical connection are preferably provided to be closed in an identical closing movement. The coupling device is preferably provided to bring about the mechanical connection and the electrical connection of the at least one attachment device to the tool basic module. For example, the coupling device can be provided to produce the mechanical and electrical connection by means of an at least substantially rectilinear movement of the at least one attachment device relative to the tool basic module. In particular, the tool basic module has an energy supply which, in at least one operating state, provides current for supplying the electrical interface. "Provided" is intended to be understood as meaning in particular specially programmed, configured and/or equipped. The fact that an object is provided for a certain function is intended to be understood as meaning in particular that the object satisfies and/or carries out said certain function in at least one use state and/or operating state.

In an advantageous manner, the electrical interface is provided for transmitting a current of at least 2 A. As a result, a tool basic module can be provided for coupling to a particularly powerful attachment device. A tool basic module can be provided for coupling to an attachment device having a high power requirement. The electrical interface is preferably provided for transmitting a current of at least 4 A, preferably of at least 10 A, particularly preferably of at least 20 A and very particularly preferably of at least 25 A. In particular, the electrical interface is provided for transmitting a current between the tool basic module and the at least one attachment device. The electrical interface is preferably provided for transmitting a current for energy supply of an electrical energy use unit of the at least one attachment device. The electrical interface is preferably provided for transmitting a power which corresponds to at least 50%, preferably at least 70%, particularly preferably at least 90% and very particularly preferably at least 100% of a maximum power consumption of the drive unit.

Furthermore, it is proposed that the electrical interface has an electrical resistance of at most 15 m) in a coupled state. As a result, a particularly low-loss connection can be achieved. A tool basic module can be provided for particularly efficient coupling to an attachment device. In this context, an "electrical resistance" of the electrical interface is intended to be understood as meaning in particular a contact resistance. In a connected state, the electrical interface preferably has a resistance of at most 10 mΩ, preferably of at most 5 mΩ and particularly preferably of at most 3 mΩ.

The electrical interface for transmitting a high power and/or a high current has at least one, in particular at least two contact elements of identical type for the electrical contact connection of the attachment device to the tool basic module. The at least one contact element is designed in particular as an electrical plug-in element. The electrical plug-in element can be designed in particular as a tulip-shaped plug.

In an advantageous refinement, the electrical interface has at least two plug-in elements and at least one insulator element which, at least in a connected state, is spatially arranged between the plug-in elements. A short circuit can thereby be particularly effectively avoided. A particularly safe and/or reliable tool basic module can be provided. In this context, a "plug-in element" is intended to be understood as meaning in particular an element for forming an electrical plug-in connection, in particular a holder, a receiving opening, a clamping and/or spring element or a pin. In this context, an "insulator element" is intended to be understood as meaning a component of an electrical non-conductor, in particular composed of a solid material. The electrical interface preferably has two receiving openings which are separated by means of the insulator element and are provided to in each case receive a corresponding plug-in element of the receiving device.

Furthermore, it is proposed that the electrical interface has at least two contact interfaces of the same type. A particularly flexibly coupleable tool basic module can thereby be provided. A particularly high level of user convenience can be achieved. In particular, the contact interfaces are formed redundantly with respect to each other. The contact interfaces are preferably arranged offset with respect to one another in a circumferential direction with respect to the main output axis of the main output. The electrical interface is preferably provided to electrically connect the attachment device in one of at least two different angular positions with respect to the main output axis of the main output. The electrical interface is preferably provided to electrically connect the attachment device in one of at least three different angular positions, which are preferably arranged equally distributed in the circumferential direction, with respect to the main output axis of the main output. The electrical interface is particularly preferably provided to electrically connect the attachment device in one of at least eight different angular positions, which are preferably arranged equally distributed in the circumferential direction, with respect to the main output axis of the main output. The contact interfaces preferably each have at least two contact elements of different polarity.

In an advantageous refinement, the coupling device has at least one further electrical interface for transmitting a low current and/or a low power, which is provided, in a coupled state, to close at least one current circuit which is independent of the electrical interface. This makes it possible for a use range of the tool basic module to be further increased. In this context, a "further electrical interface" is intended to be understood as meaning in particular an interface which is provided, in a coupled state, to close at least one current circuit which is independent of the electrical interface. In this context, a "low power" is intended to be understood as meaning in particular a power of at most 4 W, preferably a power of at most 2 W, preferably a power of at most 1 W and particularly preferably a power of at most 0.1 W. In this context, a "low current" is intended to be understood as meaning in particular a current of at most 1000 mA, preferably of at most 500 mA, preferably of at most 100 mA and particularly preferably of at most 25 mA. The at least one further electrical interface is preferably provided for transmitting a signal, in particular a signal for identifying a type of attachment of the at least one attachment device. The at least one further electrical interface is preferably provided for an electrical connection, coupled to the mechanical connection, of the at least one attachment device to the main output.

The further electrical interface for the transmission of a low power and/or a low current has in particular at least one contact element for the electrical contact connection of the attachment device to the tool basic module. The contact element has a contact surface. The electrical interface furthermore has a coupling direction. The contact surface of the contact element can be arranged at least substantially parallel to the coupling direction. In addition or alternatively, the contact surface of the contact element can be arranged at least substantially perpendicularly to the coupling direction.

In an advantageous manner, the tool basic module comprises at least one control and/or regulating unit which is provided for evaluating at least one value, which is transmitted in particular by means of the at least one further electrical interface, of a characteristic variable of the at least one attachment device. As a result, control and/or regulating variables can be set specifically for the at least one attachment device. A use of the at least one attachment device can be optimized. High operational reliability can be achieved. A "control and/or regulating unit" is intended to be understood as meaning in particular a unit with at least one electronic control unit. An "electronic control unit" is intended to be understood as meaning in particular a unit with a processor unit and with a storage unit and with an operating program stored in the storage unit. The control and/or regulating unit preferably determines a value of the characteristic variable in a testing and/or test step, in particular by means of the at least one further electrical interface and compares the value with at least one reference value for an evaluation. The control and/or regulating unit is preferably provided to determine a type, a kind or a variant of the attachment device, in particular by means of an assignment of the value of the characteristic variable to a reference value, and/or to control and/or to regulate a current, which is provided for the electrical interface, and/or a current, which is provided for the at least one further electrical interface, depending on a type, a kind or a variant of the attachment device, in particular at least substantially automatically or semi-automatically. The control and/or regulating unit is preferably provided to activate and/or to deactivate the drive unit of the tool basic module depending on a type, a kind or a variant of the type of attachment device.

Furthermore, it is proposed that the characterizing variable is in the form of a coding resistance. A characteristic value of the attachment device can thereby be provided in a structurally simple manner. In this context, a "coding resistance" is intended to be understood as meaning in particular a repeatedly measurable resistance value in a current path connectable by means of the at least one further electrical interface. Values of the coding resistance are preferably in each case assigned to one type of attachment device. The control and/or regulating unit is preferably provided to determine a value of the coding resistance in a testing and/or test step, in particular by means of a testing current.

In an advantageous manner, in at least one operating state, the control and/or regulating unit controls and/or regulates a current supply of the drive unit, a current supply of the electrical interface and/or a current supply of the further electrical interface depending on the value of the characteristic variable. Owing thereto, the tool basic module with the attachment device can be operated particularly safely and reliably. A particularly efficient and/or particularly resource-saving operation of the tool basic module with the attachment device can be achieved. User convenience can be further increased. The control and/or regulating unit is preferably provided to control and/or to regulate a current supply of the drive unit, a current supply of the electrical interface and/or a current supply of the further electrical interface at least substantially automatically or semiautomatically.

Further, it is proposed that the electrical interface has at least one contact element which is provided for a cleaning movement for cleaning a contact surface, in particular for an abrading movement. As a result, dirt particles and/or a coating, for example an oxide layer, can be removed. An, in particular permanently, low resistance of the electrical interface can be achieved. A particularly compact electrical interface with a particularly low resistance can be provided. In this context, a "cleaning movement" is intended to be understood as meaning in particular a movement, in particular a movement of two contact elements relative to each other, for removing particles which are disposed on the contact surface due to soiling, accumulation and/or due to corrosion and/or ageing. During the abrading movement, a contact force and/or a pressing force preferably acts on the contact surface, preferably at least substantially perpendicularly to the contact surfaces. In particular, at least one of the contact surfaces can have an oxide layer which is at least essentially removed by the rubbing movement. The electrical interface preferably has a cleaning distance for the cleaning movement of at least 2 mm, preferably of at least 4 mm and particularly preferably of at least 8 mm. The electrical interface preferably has at least one tulip-shaped plug socket.

Furthermore, it is proposed that the electrical interface has at least one contact element which, in a connected state, acts upon a contact surface with a pressing force of at least 4 N. A particularly good, in particular low-resistance and/or reliable electrical contact can thereby be achieved. A tool basic module with a particularly robust electrical interface can be provided. In at least one operating state, the contact surface is preferably incorporated into a current circuit. The pressing force is preferably oriented at least substantially perpendicularly to the contact surface. The at least one contact element preferably acts upon the contact surface with a pressing force of at least 5 N, preferably with a pressing force of at least 5.5 N and particularly preferably with a pressing force of at least 6 N.

The disclosure furthermore relates to an attachment device, in particular for use with a tool basic module. The attachment device comprises a working output, a main input and a coupling device which has a mechanical interface for a mechanical drive connection of the main input of the attachment device to a main output of a tool basic module. The working output of the attachment device can be designed, for example, as a tool holder. The coupling device of the attachment device furthermore has an electrical interface for transmitting a high powers and/or a high current, which is provided for an electrical connection, coupled to the mechanical connection, of the attachment device to the main output of a tool basic module.

The coupling device of the attachment device is designed in a manner corresponding to the coupling device of the tool basic module such that the coupling device of the attachment device brings about a releasable, in particular releasable without a tool, electrical and mechanical connection of the attachment device to the tool basic module. The coupling device of the attachment device has been provided to bring about the mechanical and electrical connection of the attachment device to the coupling device of the tool basic module. For this purpose, the coupling device has a mechanical interface. The mechanical interface is designed to bring about a mechanical drive connection of the attachment device to the main output of the tool basic module. In particular, the mechanical interface brings about a transmission of torque from the main output of the tool basic module to the main input of the attachment device. The mechanical interface of the attachment device is therefore designed in a manner corresponding to the mechanical interface of the tool basic module. The coupling device in particular furthermore has a locking unit with which the housing of the tool basic module is releasably mechanically connectable, in particular releasably mechanically connectable without a tool, to the housing of the attachment device. The locking unit is designed in a manner corresponding to the locking unit of the tool basic module. The locking unit in particular brings about an axial securing and/or a rotational securing of the housing of the attachment device to the housing of the tool basic module. For this purpose, the locking unit of the attachment device has at least one securing element for the axial securing and/or for the rotational securing. For example, the locking unit can have one or more securing elements which bring about both an axial securing and a rotational securing. Alternatively, the locking unit can have one or more securing elements which bring about an axial securing or a rotational securing. In the case of a locking unit of this type, at least one securing element is provided for the axial securing and at least one securing element is provided for the rotational securing. The securing element for the axial securing and the securing element for the rotational securing are designed differently from each other. The at least one securing element for the axial securing and/or rotational securing can be designed in particular as a force- and/or form-fitting securing element. The locking unit furthermore in particular has an unlocking element. The unlocking element is provided in particular to release the locking of the attachment device to the housing of the tool basic module. The unlocking element is in particular actuable manually by the user. The unlocking element is designed by way of example as a rotatably mounted unlocking ring. The unlocking element is preferably provided on the attachment device.

The coupling device furthermore has at least one electrical interface. The electrical interface is configured in particular to transmit a high power and/or a high current. The electrical interface is also referred to below as a power interface. The electrical interface of the attachment device is designed in a manner corresponding to the electrical interface of the tool basic module in order to bring about an electrical connection of the attachment device to the tool basic module. The electrical interface for the transmission of a high power and/or a high current has at least one contact element, in particular at least two contact elements of the same type, for the electrical contact connection of the attachment device to the tool basic module. The at least one contact element is designed in particular as an electrical plug-in element. The electrical plug-in element of the attachment device is designed in particular in a manner corresponding to the electrical plug-in element of the tool basic module. The electrical plug-in element of the power interface of the tool basic module can be designed in particular as a tulip-shaped plug. For this purpose, the electrical plug-in element of the power interface of the attachment device is designed in a corresponding manner in the form of a pin or a blade which can be inserted into the tulip-shaped plug of the tool basic module for the electrical connection of the attachment device.

In a further refinement, the coupling device furthermore has at least one further electrical interface. The further electrical interface is configured in particular to transmit a low power and/or a low current. The further electrical interface of the attachment device is designed in a manner corresponding to the electrical interface of the tool basic module in order to bring about an electrical connection of the attachment device to the tool basic module. The electrical interface for transmitting a low power and/or a low current has in particular at least one contact element for the electrical contact connection of the attachment device to the tool basic module. The contact element has a contact surface. The electrical interface furthermore has a coupling direction. The contact surface of the contact element can be arranged at least substantially parallel to the coupling direction. In addition or alternatively, the contact surface of the contact element can be arranged at least substantially perpendicularly to the coupling direction.

Furthermore, a portable power tool system with an, in particular independently usable, tool basic module according to the disclosure with at least one attachment device which is provided for a mechanical and/or an electrical drive connection to the tool basic module is proposed. A portable power tool system having a particularly large use range can thereby be provided. A use range can be extended in an advantageous manner by means of attachment devices, in particular by means of attachment devices having an independent energy use unit. The portable power tool system preferably comprises at least one further attachment device, preferably at least three attachment devices.

Furthermore, it is proposed that the at least one attachment device is provided for an electrical connection by means of the electrical interface and at least one further electrical interface. As a result, a use range of the portable power tool system can be increased further. A signal transmission can be separated in an advantageous manner from a power transmission. A particularly reliable signal transmission can be achieved. The electrical interface is preferably provided for power transmission. The at least one further electrical interface is preferably provided for signal transmission. It is conceivable for the at least one attachment device to be provided in each case merely for a mechanical drive connection or merely for a connection by means of at least one of the electrical interfaces.

In an advantageous refinement, the attachment device has at least one electrical energy use unit with a maximum power consumption which corresponds to at least 50% of a maximum power consumption of the drive unit of the tool basic module. As a result, attachment devices can be provided for a particularly large number of intended uses. In this context, an electrical "energy use unit" is intended to be understood as meaning in particular an electrical drive unit, in particular an electric motor, an illumination unit, a heating unit, a cooling unit, a sensor unit, a reproduction unit, a communication unit, a control and/or regulating unit, a noise-generating unit, an amplifier unit, a vibration-generating unit or a combination of such units or another unit appearing expedient to a person skilled in the art for using electrical energy. The maximum power consumption of the electrical energy use unit of the attachment device preferably corresponds to at least 70%, preferably at least 90% and particularly preferably at least 100% of the maximum power consumption of the drive unit of the tool basic module.

Furthermore, an attachment device of such a portable power tool system is proposed. An attachment device with a large use range, in particular with an electrical additional function, can thereby be provided. An attachment device which is useable in a particularly convenient manner can be provided. In this context, an "attachment device" is intended to be understood as meaning a device for a mechanical drive and/or an electrical coupling to the tool basic module. In particular, the attachment device has a mating interface which is provided for connection to the electrical interface. Preferably, the attachment device has at least one further mating interface for connection to the at least one further electrical interface. The attachment device preferably has a characteristic variable, which is readable in particular by means of the electrical interface, such as, for example, a coding resistance.

Furthermore, a method is proposed for connecting an attachment device to a tool basic module, in particular to a tool basic module according to the disclosure, which comprises a drive unit, a main output and also a coupling device which has a mechanical interface for a mechanical drive connection of the attachment device to the main output, wherein, in the method, an electrical interface of the coupling device couples an electrical connection of the attachment device to the mechanical connection. As a result, an attachment device, in particular an attachment device with an independent electrical energy use unit, can be particularly conveniently coupled to a tool basic module.

The tool basic module according to the disclosure, the portable power tool system, the attachment device and/or the method according to the disclosure is/are not intended to be limited here to the above-described use and embodiment. In particular, the tool basic module according to the disclosure and/or the method according to the disclosure can have a number of individual elements, components and units and of method steps that differs from a number thereof mentioned herein in order to carry out an operation described herein. In addition, values lying within the limits mentioned are also intended to be considered as disclosed and usable as desired within the value ranges specified in this disclosure.

BRIEF DESCRIPTION OF THE DRAWINGS

Further advantages emerge from the description below of the drawings. The drawings illustrate eight exemplary embodiments of the disclosure. The drawings, the description and the claims contain numerous features in combination. A person skilled in the art will expediently also consider the features individually and combine them into meaningful further combinations.

In the drawings.

DETAILED DESCRIPTION

Figure 1:
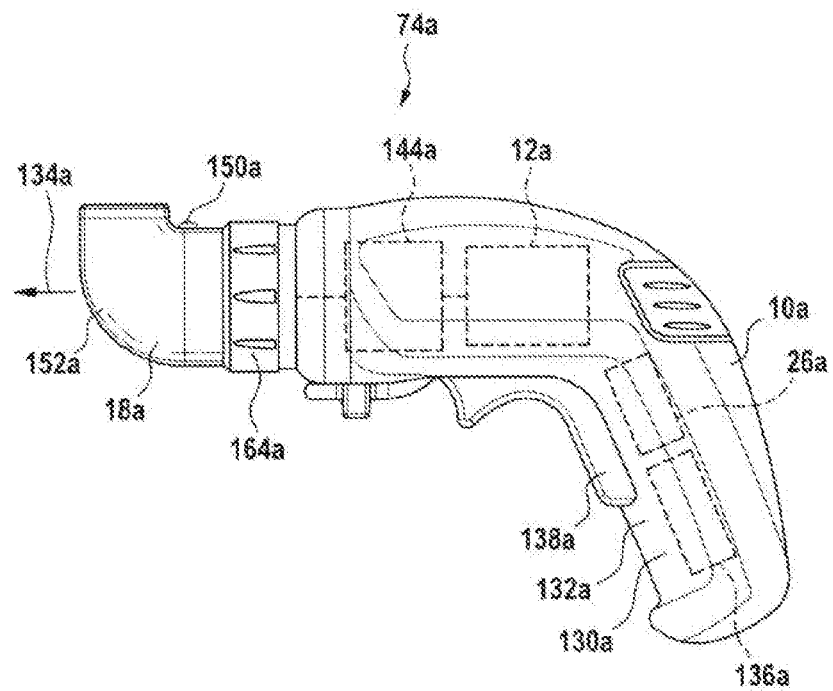
FIG. 1 shows a view of a portable power tool system with a tool basic module according to the disclosure.

FIG. 1 shows a portable power tool system 74a with an in particular independently usable, tool basic module 10a and with at least one attachment device 18a which is provided for a mechanical and/or an electrical drive connection to the tool basic module 10a.

The portable power tool system 74a comprises a tool basic module 10a for an in particular independent use. The tool basic module 10a has a drive unit 12a. The drive unit 12a is designed as an electric motor. In the present exemplary embodiment, the tool basic module 10a is designed as a screwdriver. In the present exemplary embodiment, the tool basic module 10a is designed as a battery-powered screwdriver. The tool basic module 10a has a housing 130a which, in a mounted state, supports the drive unit 12a and protects same against environmental influences, such as dust, moisture, radiation and/or impacts. The tool basic module 10a has a main working direction 134a. In the present exemplary embodiment, the housing 130a of the tool basic module 10a is designed in the shape of a pistol. The housing 130a has a handle 132a at an end oriented counter to the main working direction 134a. The handle 132a is provided to be grasped by the user with one hand for use of the tool basic module 10a and/or for use of the portable power tool system 74a. The tool basic module 10a has a mass of less than 500 g. The tool basic module 10a has a mass of at least substantially 300 g.

The tool basic module 10a has an energy supply 136a. In the present exemplary embodiment, the energy supply 136a comprises an electrical energy accumulator. In the present exemplary embodiment, the electrical energy accumulator is designed as a rechargeable storage battery. In the present exemplary embodiment, the electrical energy accumulator is designed as a lithium-ion storage battery. The portable power tool system 74a comprises a charging unit (not illustrated specifically) which is connectable to a power supply and is provided for charging the electrical energy accumulator. Alternatively, the energy supply 136a can be provided to connect the drive unit 12a directly to a power supply. It is also conceivable for the energy supply 136a to have a holder of disposable batteries as an energy accumulator.

The tool basic module 10a comprises a main switch 138a which is provided to switch on or switch off the drive unit 12a and/or to set a rotational speed and/or a torque of the drive unit 12a. The tool basic module 10a furthermore comprises a direction of rotation selector switch 140a which is provided to set a direction of rotation of the drive unit 12a.

Figure 2:
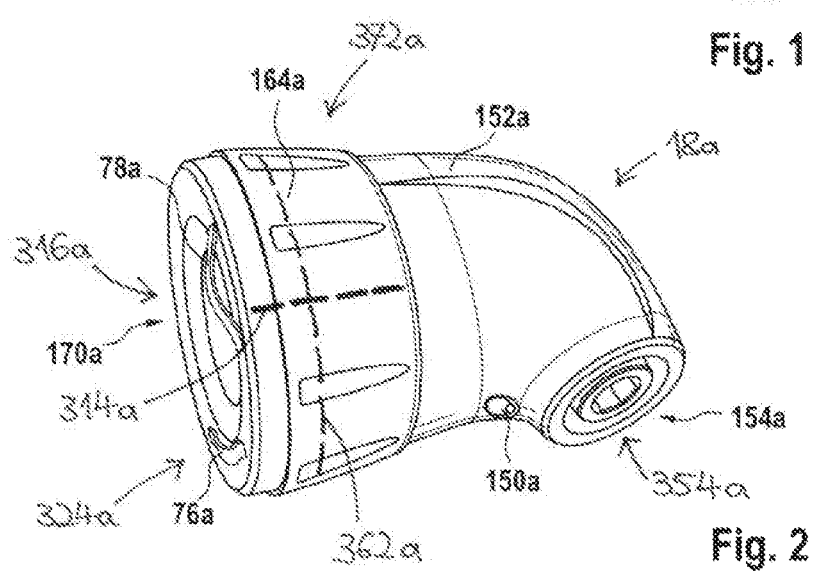
FIG. 2 shows a view of an attachment device designed as an angular attachment.

The tool basic module 10a furthermore has a main output 14a. The tool basic module 10a comprises a coupling device which has a mechanical interface 16a for a mechanical drive connection of the at least one attachment device 18a to the main output 14a. The attachment device 18a has a mechanical interface 316a corresponding to the mechanical interface 16a (cf. FIG. 2). The main output 14a has an output shaft 142a. The output shaft 142a emerges from the housing 130a at an end of the housing 130a that is oriented in the main working direction 134a of the tool basic module 10a. The output shaft 142a emerges from the housing 130a at an end of the housing 130a that faces away from the handle 132a. The main output 14a has a main output axis 68a which corresponds to an axis of rotation of the output shaft 142a. The main output 14a has a tool holder 70a which is provided for receiving an insertion tool, such as, for example, a screwdriver bit, a brush or a stirrer. In the present exemplary embodiment, the tool holder 70a is designed as a plug-in holder and has a recess 148a having a polygonal cross section. In the present exemplary embodiment, the tool holder 70a is designed as a hexagon holder. The mechanical interface 16a encloses the tool holder 70a.

The tool basic module 10a is usable as a portable power tool independently of the attachment device 18a. The tool basic module 10a is usable as such without an attachment device 18a. The drive unit 12a drives the tool holder 70a in at least one operating state. In the present exemplary embodiment, the tool basic module 10a has a gearing unit 144a which is provided to convert a torque and/or a rotational movement of the drive unit 12a into a torque and/or a rotational movement of the output shaft 142a. In the present exemplary embodiment, the gearing unit 144a has a fixedly set transmission ratio. It is conceivable for the gearing unit 144a to be designed to be switchable. The drive unit 12a provides a torque to the main output 14a in at least one operating state. The tool basic module 10a is provided to be held for use by hand. The tool basic module 10a has a handle 132a. The handle 132a is formed integrally with the housing 130a of the tool basic module 10a.

The coupling device has an electrical interface 90a for transmitting a high power and/or a high current, said interface being provided for an electrical connection, coupled to the mechanical connection, of the at least one attachment device 18a to the main output 14a. In the present exemplary embodiment, the portable power tool system 74a has attachment devices 18a, 20a, 22a. A first of the attachment devices 18a is designed as an angular attachment. A further one of the attachment devices 20a is designed as a saw attachment. A third of the attachment devices 22a is designed as a hot-melt adhesive attachment. It is conceivable for the portable power tool system 74a to comprise further attachment devices of further types, for example attachment devices designed as lights or as a drill attachment.

The electrical interface 90a is designed as a power interface and is provided for transmitting an electrical power from the tool basic module 10a to the attachment device 20a, which is designed as a saw attachment, or to the attachment device 22a, which is designed as a hot-melt adhesive attachment. The electrical interface 90a is provided for transmitting a current of at least 20 A. The electrical interface 90a is provided for transmitting a power of at least 100 watt. It is conceivable for the interface 90a to be provided for transmitting a greater current and/or a higher power, of, for example, 30 A and/or 500 watt. In a coupled state, the electrical interface 90a, which is designed as a power interface, has an electrical resistance of at most 15 mOhm. In a coupled state, the electrical interface 90a, which is designed as a power interface, has an electrical resistance of 12 mOhm.

The coupling device has a further electrical interface 24a for transmitting a low power and/or a low current, which is provided for a further electrical connection, coupled to the mechanical connection, of the attachment devices 18a, 20a, 22a to the main output 14a. The electrical interface 24a is provided for transmitting an electrical power and/or an electrical signal between the tool basic module 10a and the attachment devices 18a, 20a, 22a. The electrical interface 24a is provided for transmitting a current of at most 25 mA. It is conceivable for the interface 24a to be provided for transmitting a current of up to 1 A. It is conceivable for the coupling device, in an alternative refinement, merely to have the further electrical interface 24a for transmitting a low power and/or a low current, i.e. for the interface 90a designed as a power interface to be omitted. The further electrical interface 24a for transmitting a low current and/or a low power is provided, in a coupled state, to close at least one current circuit which is independent of the electrical interface 90a designed as a power interface.

The attachment device 18a which is designed as an angular attachment is provided for a mechanical and an electric drive connection to the tool basic module 10a. The attachment device 18a has a main input 314a (schematically illustrated). The main input 314a is provided for transmitting a torque from the main output 14a to the attachment device 18a. The main input 314a of the attachment device 18a can be designed as a drive shaft (not illustrated specifically). In the embodiment illustrated, the main input 314a is provided for a non-rotatable connection to the tool holder 70a of the tool basic module 10a. The drive shaft has a coupling region (not illustrated) which is provided for engaging a drive coupling of the attachment device 18a to the tool basic module 10a into the recess 148a of the tool holder 70a. In the present exemplary embodiment, the attachment device 18a, which is designed as an angular attachment, has a light 150a. The attachment device 18a has an angular gearing. The attachment device 18a has a housing 152a which, in a mounted state, supports the angular gearing and the drive shaft. The attachment device 18a has a working output 354a in the form of a tool holder 154a which is provided for receiving an insertion tool, such as, for example, a screwdriver bit, a brush or a stirrer. The tool holder 154a has an axis of rotation which, in a coupled state, encloses an angle of at least substantially 90 degrees with the main output axis 68a. The tool basic module 10a is provided for coupling to different types of attachment devices 18a, for example to an attachment for limiting torque, to a corkscrew attachment, to an eccentric attachment, to a drilling attachment or to another attachment appearing suitable to a person skilled in the art. The coupling device has an abutment surface for the attachment devices 18a, 20a, 22a. The abutment surface is of annular design. The attachment devices 18a, 20a, 22a each have an electrical interface 324a as a mating interface which is designed in a manner corresponding to the further electrical interface 24a of the tool basic module 10a. In an operating state, the energy supply 136a of the tool basic module 10a supplies the light 150a of the attachment device 18a with electrical energy via the further electrical interface 24a and via the electrical interface 324a as a mating interface.

The tool basic module 10a comprises at least one control and/or regulating unit 26a which is provided for evaluating at least one value, which is transmitted in particular by means of the other electrical interface 24a, of a characteristic variable of the at least one attachment device 18a. The characteristic variable is in the form of a coding resistance. The characteristic variable unambiguously identifies a type of the attachment device 18a. The attachment device 18a has a value, which is specific to the type, for the characteristic variable. In a coupled state, the control and/or regulating unit 26a subjects the further electrical interface 24a to a testing current and determines the value of the characteristic variable. From the value of the characteristic variable, the control and/or regulating unit 26a identifies a type of the coupled attachment device 18a.

In at least one operating state, the control and/or regulating unit 26a controls and/or regulates a current supply of the drive unit 12a, a current supply of the electrical interface 90a and/or a current supply of the further electrical interface 24a depending on the value of the characteristic variable. For example, depending on the type of the coupled attachment device 18a, the control and/or regulating unit 26a defines control and/or regulating variables, such as, for example, limit values of a power supplied to the drive unit 12a, limit values of a power, a torque and/or a rotational speed which are transmitted via the output shaft 142a. It is conceivable for the control and/or regulating unit 26a to switch off and/or deactivate the drive unit 12a depending on a type of the coupled attachment device 18a. It is also conceivable for the control and/or regulating unit 26a to activate the drive unit 12a depending on a type of the coupled attachment device 18a for an idling operation. Depending on the type of the coupled attachment device 18a, the control and/or regulating unit 26a defines control and/or regulating variables for the electrical interface 90a, which is designed as a power interface, such as, for example, limit values of a power, a current and/or a voltage. It is conceivable for the tool basic module 10a to have a switchover unit which can be operated by a user and is provided for switching on and/or switching off a current supply of the drive unit 12a, a current supply of the electrical interface 90a and/or a current supply of the further electrical interface 24a. It is also conceivable for the switchover unit to have an actuating element which is actuated during an operation to couple one of the attachment devices 18a, 20a, 22a to the tool basic module 10a.

The electrical interfaces 24a, 90a have a common coupling direction 40a. The mechanical interface 16a and the electrical interfaces 24a, 90a have a common coupling direction 40a. During a coupling operation, the tool basic module 10a and the attachment device 18a are moved relative to each other at least substantially in the direction of the coupling direction 40a. The further electrical interface 24a has at least one contact surface 28a, 30a, 32a, 34a which is arranged at least substantially in a contact plane which is arranged at least substantially perpendicularly to the coupling direction 40a. The contact surface 28a, 30a, 32a, 34a is designed to be at least substantially flat. The at least one contact surface 28a, 30a, 32a, 34a has a surface normal which is arranged at least substantially parallel to the coupling direction 40a. The further electrical interface 24a of the tool basic module 10a has a plurality of contact surfaces 28a, 30a, 32a, 34a. In the present exemplary embodiment, the electrical interface 24a of the tool basic module 10a has sixteen contact surfaces 28a, 30a, 32a, 34a. For the sake of clarity, only four contact surfaces 28a, 30a, 32a, 34a of the sixteen contact surfaces 28a, 30a, 32a, 34a are provided with a reference sign. The contact surfaces 28a, 30a, 32a, 34a of the further electrical interface 24a are all designed to be at least substantially flat and are arranged in the contact plane.

The coupling device has at least one at least partially disk-shaped support element 42a with an end surface on which the at least one contact surface 28a, 30a, 32a, 34a is arranged. All of the contact surfaces 28a, 30a, 32a, 34a of the further electrical interface 24a are arranged on the end surface. The end surface and the contact surfaces 28a, 30a, 32a, 34a at least substantially form a continuous surface. The end surface and the contact surfaces 28a, 30a, 32a, 34a are arranged in an at least substantially coplanar manner. In the present exemplary embodiment, the support element 42a is formed of plastic. In a mounted state, the support element 42a is connected fixedly and immovably to the housing 152a of the tool basic module 10a. In the present exemplary embodiment, the support element 42a is formed integrally with a housing part. The end surface of the support element 42a is designed substantially in the shape of a circular ring. It has a disk plane which defines the direction of the contact plane of the further electrical interface 24a. The end surface of the support element 42a, on which the contact surfaces 28a, 30a, 32a, 34a of the further electrical interface 24a are arranged, has the abutment surface of the coupling device for the attachment device 18a.

The disk-shaped support element 42a has an outer circumference, from which the at least one contact surface 28a, 30a, 32a, 34a is arranged at a distance. The outer circumference of the support element 42a corresponds to a circumference of an outer circle of the support element 42a designed in the shape of a circular ring. The contact surfaces 28a, 30a, 32a, 34a of the electrical interface 24a are all arranged at a distance from the outer circumference of the support element 42a. The contact surfaces 28a, 30a, 32a, 34a are arranged in the radial direction within the outer circumference of the support element 42a.

Figure 3:
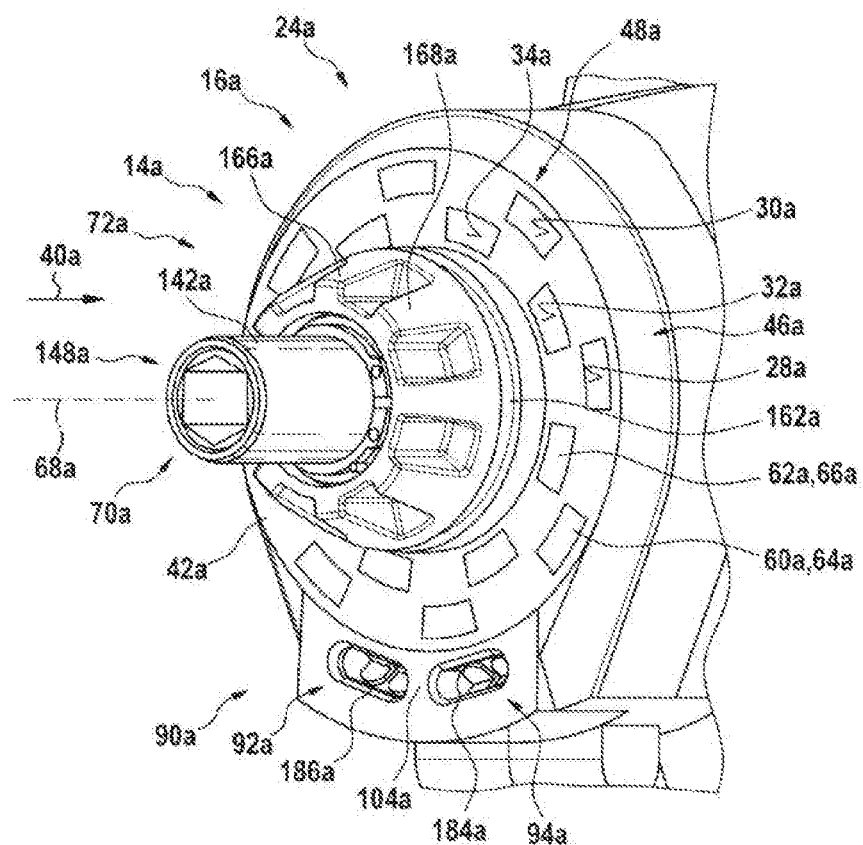
FIG. 3 shows a view of a main output of the tool basic module.

The further electrical interface 24a has at least two contact interfaces 46a, 48a of identical type. In the present exemplary embodiment, the further electrical interface 24a has eight contact interfaces 46a, 48a of identical type. In FIG. 3, for the sake of clarity, only two of the contact interfaces 46a, 48a are provided with reference signs. Each of the contact interfaces 46a, 48a comprises two contact surfaces 28a, 30a, 32a, 34a which, in at least one operating state, have a different electrical polarity. The contact interfaces 46a, 48a are formed redundantly with respect to each other. The contact interfaces 46a, 48a are formed in a functionally equivalent manner with respect to each other. The contact surfaces 28a, 30a, 32a, 34a of two different contact interfaces 46a, 48a are arranged offset with respect to each other in the circumferential direction. The contact surfaces 28a, 30a, 32a, 34a of two contact interfaces 46a, 48a arranged adjacent in the circumferential direction each have an intermediate angle of in each case at least substantially 45 degrees. The positions of the contact surfaces 28a, 30a, 32a, 34a of two contact interfaces 46a, 48a merge into one another by rotation about the main output axis 68a of the tool basic module 10a. The contact interfaces 46a, 48a are provided to electrically connect the attachment device 18a to the tool basic module 10a in eight different angular positions, with respect to the main output axis 68a of the tool basic module 10a.

The further electrical interface 24a has at least one contact surface ring 60a. In the present exemplary embodiment, the contact surface ring 60a comprises eight of the contact surfaces 28a, 30a of the further electrical interface 24a. The eight contact surfaces 28a, 30a of the contact surface ring 60a are in each case assigned eight different contact interfaces 46a, 48a of the further electrical interface 24a. The contact surfaces 28a, 30a of the contact surface ring 60a are at least substantially at an identical distance from the output shaft 142a of the tool basic module 10a. The contact surfaces 28a, 30a of the contact surface ring 60a are arranged annularly. The contact surfaces 28a, 30a of the contact surface ring 60a are arranged uniformly distributed in the circumferential direction. Contact surfaces 28a, 30a which are adjacent in the circumferential direction are in each case offset with respect to one another by an angle of 45 degrees. The contact surfaces 28a, 30a are designed in the form of circular ring portions which are arranged concentrically with respect to the contact surface ring 60a. A main direction of extent of the contact surfaces 28a, 30a is arranged at least substantially parallel to a circumferential direction.

Figure 4:
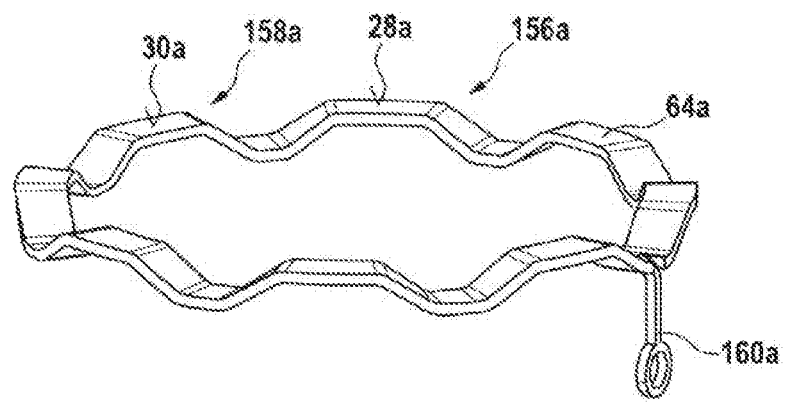
FIG. 4 shows a view of a contact element of the tool basic module.

The contact surface ring 60a is formed by a single contact element 64a (cf. FIG. 4). It is also conceivable for the contact surface ring 60a to be formed by a plurality of contact elements. In at least one active operating state of the electrical interface 24a, the contact surfaces 28a, 30a of the contact surface ring 60a have an identical electrical potential. The contact element 64a is designed at least substantially in the shape of a circular ring. The contact element 64a has eight elevations 156a, 158a in the axial direction. For the sake of clarity, only two of the elevations 156a, 158a are provided with reference signs in FIG. 4. The surfaces of the elevations 156a, 158a form the contact surfaces 28a, 30a of the contact surface ring 60a. The elevations 156a, 158a have an at least substantially identical height with respect to a main plane of the contact surface ring 60a. The elevations 156a, 158a are arranged uniformly distributed in the circumferential direction. Elevations 156a, 158a which are adjacent in the circumferential direction are offset with respect to one another by an angle of 45 degrees. The contact element 64a has a contact tab 160a. The contact tab 160a is provided for connection of the contact element 64a.

The further electrical interface 24a has at least one further contact surface ring 62a which is arranged at least substantially concentrically with respect to the contact surface ring 60a. In the present exemplary embodiment, the further contact surface ring 62a comprises a further eight of the contact surfaces 32a, 34a of the further electrical interface 24a. The eight further contact surfaces 32a, 34a of the further contact surface ring 62a are in each case assigned to eight different contact interfaces 46a, 48a of the further electrical interface 24a. Each contact surface 32a, 34a of the further contact surface ring 62a is respectively assigned to a contact surface 28a, 30a of the contact surface ring 60a. Each contact surface 32a, 34a of the further contact surface ring 62a and each contact surface 28a, 30a of the contact surface ring 60a are assigned to a common contact interface 46a, 48a. The contact surfaces 28a, 30a of the contact surface ring 60a and the contact surfaces 32a, 34a of the further contact surface ring 62a are arranged in an at least substantially alternating manner in the circumferential direction. Each contact surface 32a, 34a of the further contact surface ring 62a is arranged at least substantially in a gap between two adjacent contact surfaces 28a, 30a of the contact surface ring 60a.

The contact surfaces 32a, 34a of the further contact surface ring 62a are at least substantially at an identical distance from the output shaft 142a of the tool basic module 10a. The contact surfaces 32a, 34a of the further contact surface ring 62a are arranged annularly. The contact surfaces 32a, 34a of the further contact surface ring 62a are arranged distributed uniformly in the circumferential direction. Contact surfaces 32a, 34a which are adjacent in the circumferential direction are each offset with respect to each other by an angle of 45 degrees. The contact surfaces 32a, 34a are designed in the form of circular ring portions which are arranged concentrically with respect to the further contact surface ring 62a. A main direction of extent of the contact surfaces 32a, 34a is arranged at least substantially parallel to a circumferential direction.

The further contact surface ring 62a and the contact surface ring 60a have different radii. The further contact surface ring 62a has a smaller radius than the contact surface ring 60a. The contact surfaces 28a, 30a of the contact surface ring 60a are arranged radially spaced apart from the contact surfaces 32a, 34a of the further contact surface ring 62a. The contact surfaces 28a, 30a of the contact surface ring 60a are at a distance of at least substantially 0.5 mm from the outer circumference of the support element 42a. The contact surfaces 32a, 34a of the further contact surface ring 62a are at a distance of at least substantially 2.5 mm from the outer circumference of the support element 42a.

The further contact surface ring 62a is formed by a single further contact element 66a. It is also conceivable for the further contact surface ring 62a to be formed by a plurality of contact elements. In at least one active operating state of the electrical interface 24a, the contact surfaces 32a, 34a of the further contact surface ring 62a have an identical electrical potential. Apart from a radius, the further contact element 66a is formed analogously to the contact element 66a. The further contact element 66a is at least substantially designed in the shape of a circular ring. The further contact element 66a has eight elevations in the axial direction. The surfaces of the elevations form the contact surfaces 32a, 34a of the further contact surface ring 62a. The elevations have an at least substantially identical height with respect to a main plane of the further contact surface ring 62a. The elevations are arranged distributed uniformly in the circumferential direction. Elevations which are adjacent in the circumferential direction are offset with respect to one another by an angle of 45 degrees. The contact element 66a has a contact tab. The contact tab is provided for connection of the contact element 66a.

The support element 42a has a relief ring on a side facing away from the contact plane. The relief ring has a shape which corresponds to the contact element 64a of the contact surface ring 60a. The support element 42a has eight apertures along the relief ring. In a mounted state, the contact element 64a is placed into the support element 42a. One elevation 156a, 158a is in each case assigned to one of the apertures. One elevation 156a, 158a is in each case visible at one of the apertures on the end side of the support element 42a. The support element 42a has a further relief ring on the side facing away from the contact plane. The further relief ring has a shape which corresponds to a shape of the further contact element 66a. The support element 42a has eight apertures along the further relief ring. The support element 42a has a total of sixteen apertures. In a mounted state, the further contact element 64a is placed into the support element 42a. One elevation is in each case assigned to one of the apertures. One elevation in each case is visible at one of the apertures on the end side of the support element 42a.

The coupling device of the tool basic module 10a has a locking unit 72a for locking of the attachment device 18a (cf. FIG. 3). The locking unit 72a is arranged at the main output 14a. The locking unit 72a is provided to lock the housing 152a of the attachment device 18a to the housing 130a of the tool basic module 10a. The locking unit 72a is provided to connect the housing 152a of the attachment device 18a to the housing 130a of the tool basic module 10a axially and so as to be secure against rotation. The attachment device 18a has a locking unit 372a corresponding to the locking unit 72a. The locking unit 72a has at least one securing element 162a for an axial securing of a connection of the housings 130a, 152a. In the present exemplary embodiment, the securing element 162a is designed as a groove encircling in the circumferential direction. The securing element 162a is arranged on the housing 130a of the tool basic module 10a. In an alternative refinement, the securing element can be designed as a rib and/or can be arranged on the output shaft 142a. The attachment device 18a has a securing element 362a (cf. FIG. 2) which is designed in a manner corresponding to the securing element 162a and is provided for engagement in the securing element 162a. The securing element 362a is designed as a latching element. The latching element can be designed, for example, as a latching spring. The securing element 362a of the attachment device 18a serves for the axial securing of the attachment device 18a on the housing 130a. In a coupled state, the securing element 162a and the securing element 362a form a form-fitting and/or force-fitting connection. In an alternative refinement, the securing element 162a and the securing element 362a can be provided to form an at least partially force-fitting connection.

The attachment device 18a has an unlocking ring 164a for releasing the attachment device 18a from the tool basic module 10a. The unlocking ring 164a is part of the locking unit 372a. The locking unit 372a brings about the releasable mechanical connection of the attachment device 18a to the housing 130a of the tool basic module 10a. In a coupled state, the unlocking ring 164a is arranged at an end of the attachment device 18a that faces the tool basic module 10a. The unlocking ring 164a is arranged mounted on the attachment device 18a so as to be rotatable in the circumferential direction and is provided for operation manually. The unlocking ring 164a is provided to tension and to release the securing element 362a in the form of a latching element in order to separate the attachment device 18a from the tool basic module 10a.

The locking unit 72a has a further securing element 166a which is provided for a rotational securing. In the present exemplary embodiment, the further securing element 166a is formed integrally with the housing 130a of the tool basic module 10a. The further securing element 166a is designed as a toothed ring and has eight teeth 168a which are arranged distributed uniformly in the circumferential direction. For the sake of clarity, only one of the teeth 168a is provided with a reference sign. The attachment device 18a has a holder 170a which is designed in a manner corresponding to the further securing element 166a and has a securing element 366a (cf. FIG. 8). The securing element 366a is accordingly likewise provided for the rotational securing. The securing element 366a is designed as a toothed ring, the teeth 368a of which are arranged distributed uniformly in the circumferential direction. In a coupled state, the further securing element 166a engages in the securing element 366a of the holder 170a of the attachment device 18a. In a coupled state, the further securing element 166a transmits forces acting on the attachment device 18a in the circumferential direction via the securing element 366a to the housing 130a of the tool basic module 10a. The securing element 362a, which is designed as a latching element, engages in the securing element 162a, which is designed as a groove, and transmits forces acting on the attachment device 18a in the axial direction to the housing 130a of the tool basic module 10a.

The tool holder 154a and the at least one locking unit 72a are arranged at least substantially on an identical side of the contact plane of the electrical interface 24a with respect to a direction of the main output axis 68a. The tool holder 154a, the axial securing element 162a which is designed as a groove, and the further securing element 166a are arranged at least substantially on an identical side of the contact plane of the electrical interface 24a with respect to a direction of the main output axis 68*a*. The gearing unit 144*a* of the tool basic module 10*a* is arranged on a different side of the contact plane than the locking unit 72*a* and/or the tool holder 154*a* with respect to the main output axis 68*a*.

Figure 8:
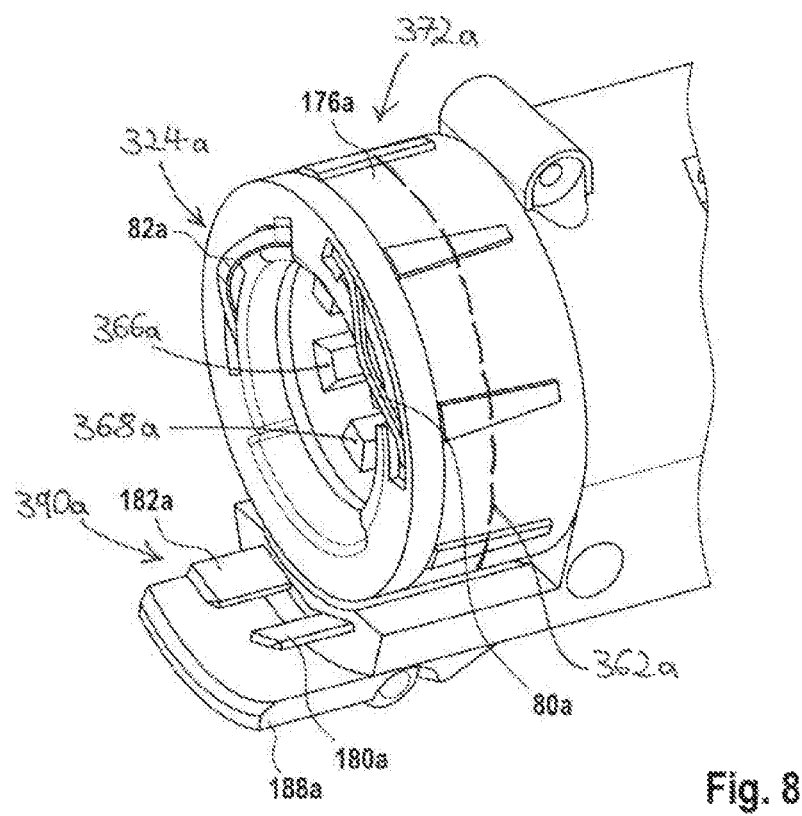
FIG. 8 shows a detailed view of a coupling region of the attachment device.

The electrical interface 324*a* of the attachment device 18*a* has at least one contact element 76*a*, 78*a* (cf. FIG. 2) or 80*a*, 82*a* (cf. FIG. 8). In the embodiment illustrated, the contact elements 76*a*, 78*a* are provided to convert a closing movement for a connection of the attachment device 18*a* into a frictional movement which is oriented at least substantially perpendicularly to a direction of the closing movement (cf. FIG. 2). The electrical interface 324*a* of the attachment device 18*a* is designed in a manner corresponding to the further electrical interface 24*a* of the tool basic module 10*a* and forms an electrical mating interface therewith. The mating interface has a first of the contact elements 76*a* and a further one of the contact elements 78*a*. The first contact element 76*a* is provided for contact with the contact element 64*a* of the further electrical interface 24*a*. The further contact element 78*a* is provided for contact with the further contact element 66*a* of the further electrical interface 24*a*. In the embodiment illustrated, the contact elements 76*a*, 78*a* of the mating interface are designed as spring contact elements. The contact elements 76*a*, 78*a* of the mating interface are provided for providing a contact spring force in the axial direction. The contact elements 76*a*, 78*a* are designed as bow springs. The contact elements 76*a*, 78*a* each have a bow-type curvature in the axial direction. In a coupled state, the first contact element 76*a* of the mating interface is at a radial distance from the output shaft 142*a*, said distance corresponding to the radial distance of the contact element 64*a* of the further electrical interface 24*a* from the output shaft 142*a*, and the further contact element 78*a* of the mating interface is at a radial distance from the output shaft 142*a*, said radial distance corresponding to the radial distance of the further contact element 66*a* of the further electrical interface 24*a* from the output shaft 142*a*.

Figure 5:
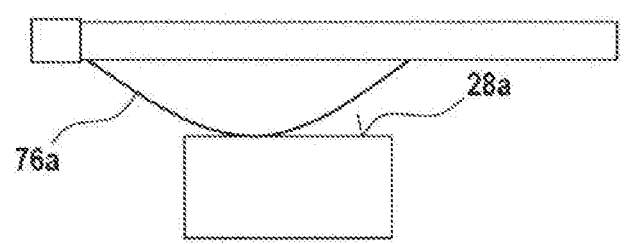
FIG. 5 shows a schematic side view of a contact element of the attachment device.

The contact elements 76*a*, 78*a* of the electrical interface 324*a* are in each case connected on one side at least substantially fixedly and immovably to the housing 152*a* of the attachment device 18*a* (cf. FIG. 5). During a coupling operation, the attachment device 18*a* is placed in the coupling direction 40*a* onto the tool basic module 10*a*, and the contact elements 76*a*, 78*a* of the mating interface come into contact with the contact elements 64*a*, 66*a* of the further electrical interface 24*a*. The contact elements 76*a*, 78*a* each have a bow apex which comes into contact with the contact elements 64*a*, 66*a* of the further electrical interface 24*a*. Over a further course of the closing movement, the bow apexes are pushed along the contact elements 64*a*, 66*a* of the further electrical interface 24*a* and carry out a frictional movement in relation to the contact elements 64*a*, 66*a* of the further electrical interface 24*a*. The frictional movement, as a cleaning movement, makes it possible to remove a coating on the contact surfaces 28*a*, 30*a*, 32*a*, 34*a* of the contact elements 64*a*, 66*a*, 76*a*, 78*a*.

Figure 6:
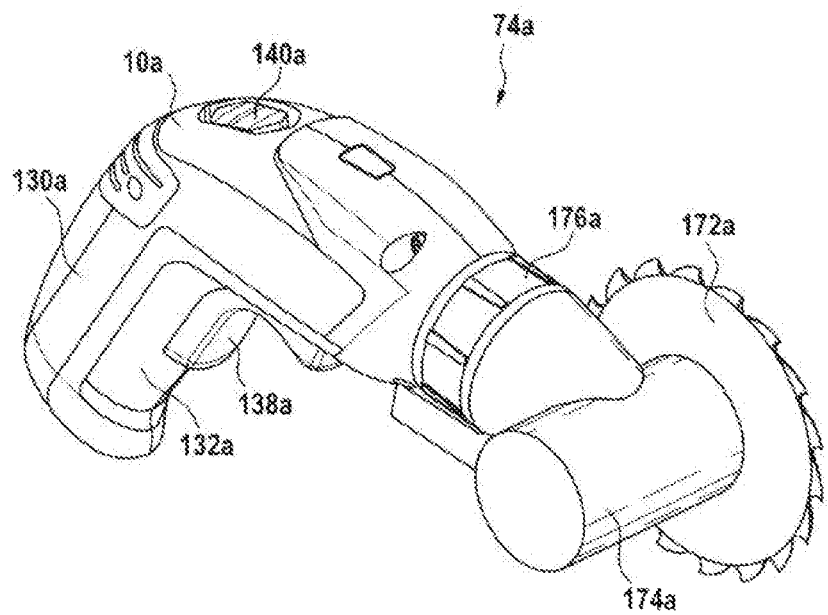
FIG. 6 shows a perspective view of the portable power tool system with an attachment device designed as a saw.

The further attachment device 20*a* has a saw blade 172*a* (cf. FIG. 6). The further attachment device 20*a* has an electrical interface 390*a*, which is designed in a manner corresponding to the electrical interface 90*a* designed as a power interface, as a mating interface. The further attachment device 20*a* has an electrical interface 324*a*, which is designed in a manner corresponding to the further electrical interface 24*a*, as a further mating interface. The electrical interface 324*a* designed as a further mating interface has two contact elements 80*a*, 82*a* which are designed analogously to the contact elements 76*a*, 78*a* of the first attachment device 18*a*. The further attachment device 20*a* is provided for an electrical connection by means of the electrical interface 90*a* and the further electrical interface 16*a*. The further attachment device 20*a* comprises a housing 174*a* and an unlocking ring 176*a* which is designed analogously to the unlocking ring 164*a* of the attachment device 18*a*, which is designed as an angular attachment.

Figure 7:
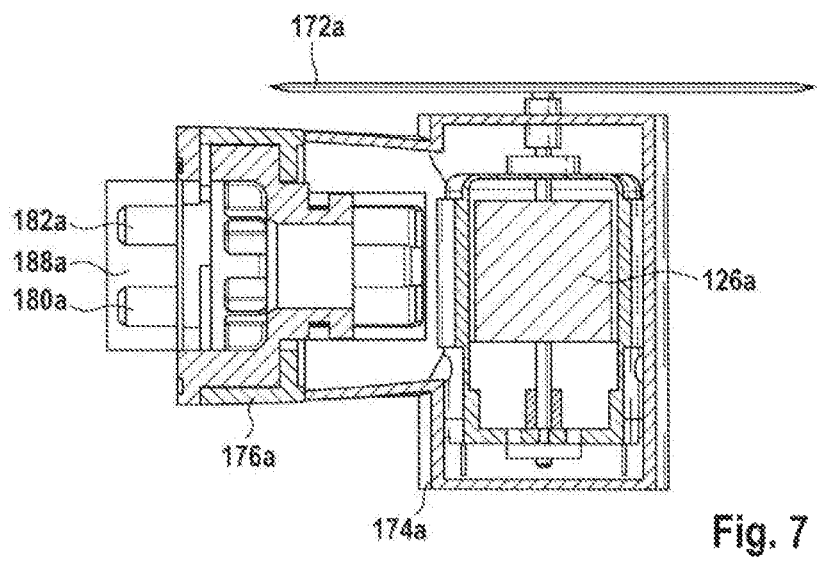
FIG. 7 shows a partially sectioned view of the attachment device designed as a saw.

The further attachment device 20*a* comprises at least one electrical energy use unit 126*a* which is designed as an electric motor. The energy use unit 126*a* is provided for a drive of the saw blade 172*a* (cf. FIG. 7). The energy use unit 126*a* is provided for a drive of the saw blade 172*a* independently of the drive unit 12*a* of the tool basic module 10*a*. The at least one electrical energy use unit 126*a* has a maximum power consumption which corresponds to at least 90% of a maximum power consumption of the drive unit 12*a* of the tool basic module 10*a*. It is conceivable for the further attachment device 20*a* to comprise a further electrical energy use unit, for example a light, which, in at least one operating state, is supplied with energy via the further electrical interface 24*a*.

The electrical interface 90*a* designed as a power interface has at least two plug-in elements 92*a*, 94*a*. The two plug-in elements 92*a*, 94*a* are designed similarly. The electrical interface 90*a* furthermore has at least one insulator element 104*a* which, at least in a connected state, is arranged spatially between the plug-in elements 92*a*, 94*a*. In the present exemplary embodiment, the plug-in elements 92*a*, 94*a* are designed for receiving mating plug-in elements 180*a*, 182*a* of the attachment device 20*a*, said mating plug-in elements being designed in a manner corresponding to the plug-in elements 92*a*, 94*a*. The mating plug-in elements 92*a*, 94*a* are designed as tulip-shaped plugs. In the present exemplary embodiment, the mating plug-in elements 180*a*, 182*a* are designed as pins or blades. The plug-in elements 92*a*, 94*a* are in each case arranged in an opening 184*a*, 186*a* in the support element 42*a*. In a connected state, the mating plug-in elements 180*a*, 182*a*, designed as pins or blades, of the attachment device 20*a* penetrate the openings 184*a*, 186*a*. In the present exemplary embodiment, the insulator element 104*a* is designed as a web composed of an electrical non-conductor. In the present exemplary embodiment, the insulator element 104*a* is designed as a web composed of plastic. In an alternative embodiment (not illustrated), it is conceivable for the plug-in elements 92*a*, 94*a* to be designed in the form of tulip-shaped plugs on the attachment device 20*a*, and for the tool basic module 10*a* to have mating plug-in elements 180*a*, 182*a*, which are designed in a manner corresponding to the plug-in elements 92*a*, 94*a*, holders designed in the form of pins or blades.

The coupling device comprises a mechanical protective element 188*a* for protecting the mating plug-in elements 180*a*, 182*a*, designed as pins, of the attachment device 20*a* against a mechanical action. The protective element 188*a* is designed as a housing projection. The protective element 188*a* is arranged on an edge of the housing 174*a* of the attachment device 20*a* (cf. FIG. 8). The protective element 188*a* projects axially beyond the unlocking ring 164*a* of the attachment device 20*a*. The protective element 188*a* is arranged axially and radially with respect to the coupling direction 40*a* on an identical side of the housing 174*a* as the mating plug-in elements 180*a*, 182*a*.

Figure 9:
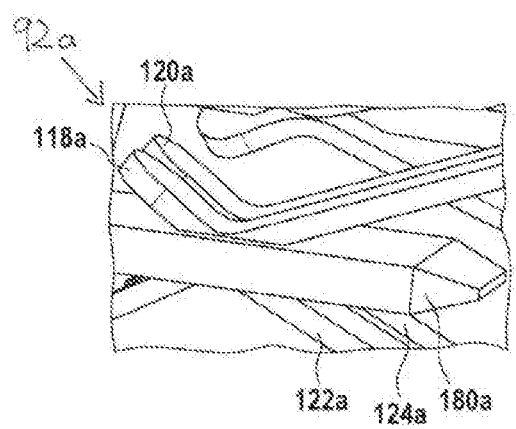
FIG. 9 shows a detailed view of an electrical interface designed as a power interface.
Figure 27:
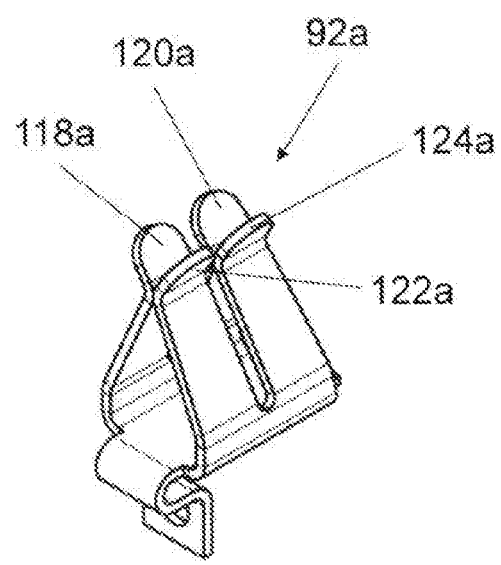
FIG. 27 shows a plug-in element of the electrical interface, which is in the form of a power interface, according to FIG. 9.

The plug-in elements 92*a*, 94*a* of the electrical interface 90*a*, which is designed as a power interface, have at least one contact element 118*a*, 120*a*, 122*a*, 124*a* which is provided for a cleaning movement of a contact surface, in particular for a grinding movement (cf. FIGS. 9, 27). The plug-in elements 92a, 94a of the electrical interface 90a are designed analogously to each other, and therefore only one plug-in element 92a is described in more detail below. The plug-in element 92a is designed as a tulip-shaped plug. In the present exemplary embodiment, the plug-in element 92a has two pairs of contact elements 118a, 120a, 122a, 124a. The contact elements 118a, 120a, 122a, 124a are each designed as contact springs. Contact elements 118a, 120a, 122a, 124a of a pair are pretensioned against each other and each have a bow apex at which they make contact. The contact elements 118a, 120a, 122a, 124a of a pair are designed analogously to each other and are arranged in a mirror-inverted manner with respect to each other. The pairs of contact elements 118a, 120a, 122a, 124a are arranged offset laterally with respect to one another with respect to a main direction of extent of the contact elements 118a, 120a, 122a, 124a. It is conceivable for the holder to have only one pair of contact elements or a greater number of pairs of contact elements differing from two. The contact elements 118a, 120a, 122a, 124a of a pair of contact elements 118a, 120a, 122a, 124a are each provided in order, during a coupling operation, to interact with a pin or a blade 180a, 182a of the attachment device 20a and to produce an electrical contact. The contact elements 118a, 120a, 122a, 124a and the pin or the blade 180a, 182a each have a contact surface. The contact elements 118a, 120a, 122a, 124a carry out a grinding movement relative to the pin during a coupling operation, the grinding movement corresponding to a cleaning movement of the contact surfaces.

In a connected state, the contact elements 118a, 120a, 122a, 124a of the electrical interface 90a, which is designed as a power interface, subject the contact surfaces to a pressing force of at least 5 N. The pressing force of a first contact element 118a, 122a of a pair is in each case oriented in an opposed manner to the pressing force of a second contact element 120a, 124a of the pair. In the connected state, the contact elements 118a, 120a, 122a, 124a are in contact on mutually opposite sides of the associated mating plug-in element 180a, 182a of the attachment device 20a with the mating plug-in element 180a, 182a.

In a method for connection of the attachment devices 18a, 20a, 22a to the tool basic module 10a, the electrical interface 90a, designed as a power interface, of the coupling device couples a first electrical connection of the attachment device 18a, 20a, 22a to the mechanical connection and the further electrical interface 24a of the coupling device couples a further electrical connection of the attachment devices 18a, 20a, 22a to the mechanical connection.

Figure 10:
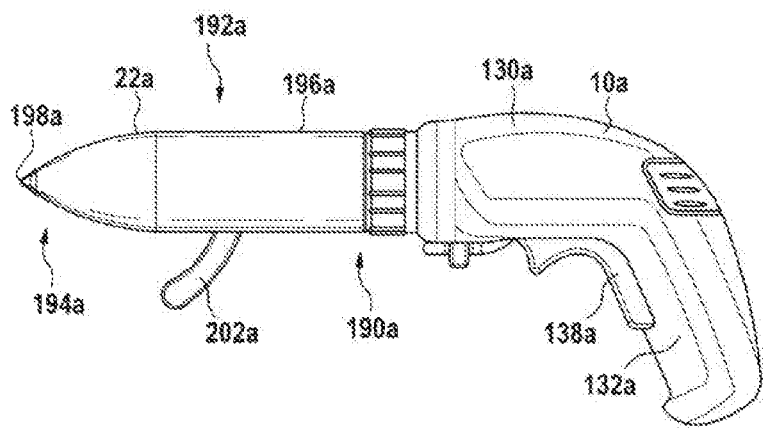
FIG. 10 shows a schematic side view of the portable power tool system with an attachment device designed as a hot-melt adhesive attachment.
Figure 11:
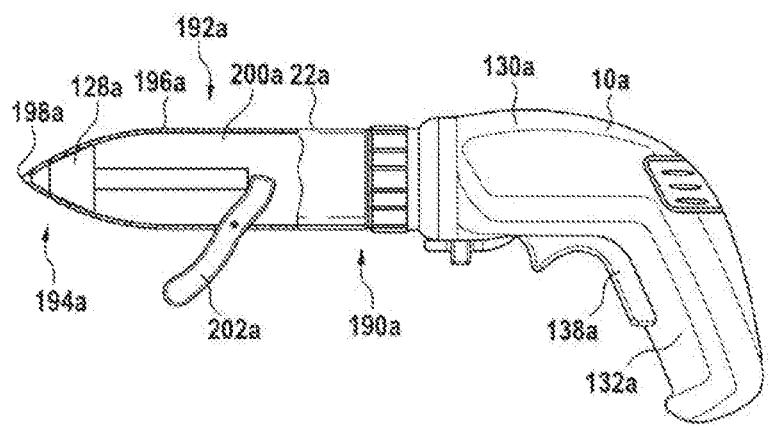
FIG. 11 shows a schematic partially sectioned view of the portable power tool system.

The third attachment device 22a, which is designed as a hot-melt adhesive attachment, has an energy use unit 128a which is designed as an adhesive heating means. The attachment device 22a has a coupling region 190a, an adhesive storage region 192a and a heating region 194a which are arranged adjacent to one another in an axial direction. In the present exemplary embodiment, the adhesive storage region 192a is designed as a push-in compartment. The third attachment device 22a has a housing 196a with a conical basic shape (cf. FIG. 10). The housing 196a tapers from the coupling region 190a via the adhesive storage region 192a toward the heating region 194a. The heating region 194a is of conical design and has an adhesive tip 198a as working output 354a of the attachment device 22a which has a nozzle as an outlet for an adhesive. The housing 196a forms, in the adhesive storage region 192a, an adhesive storage container 200a which is provided for the holder 170a of an adhesive, for example a glue stick (cf. FIG. 11). It is also conceivable for the adhesive storage container 200a to be provided for an adhesive in the form of granules. The energy use unit 128a, which is designed as an adhesive heating means, is arranged in the heating region 194a of the attachment device 22a and has a heating coil. The energy use unit 128a is provided for converting electrical energy of the energy supply 136a into heat and, in an operating state, heats the adhesive. In the present exemplary embodiment, the adhesive is designed as a hot-melt adhesive. In at least one operating state, the energy use unit 128a is supplied with energy via the electrical interface 90a designed as a power interface.

The third attachment device 22a has a feed unit with an operating element 202a which is provided for transport of adhesive. In the present exemplary embodiment, the operating element 202a is designed as a lever. The operating element 202a penetrates the housing 196a and has an outer lever arm and an inner lever arm. The operating element 202a has a bearing point spatially between the outer lever arm and the inner lever arm, said bearing point being designed as a pivot point and in which the operating element 202a is mounted pivotably in relation to the housing 196a. In the present exemplary embodiment, a main direction of extent of the handle 132a, the main output axis 68a of the main output 14a and the operating element 202a are arranged in a mounted state. It is also conceivable for the operating element 202a to be arranged rotated with respect to the main output axis 68a. It is furthermore conceivable for the operating element 202a to be designed as a sliding element and/or to comprise a spring element which is provided for providing a force for transporting the adhesive or a resetting force. It is furthermore conceivable for the attachment device 22a to have a feed unit for transporting adhesive without an operating element 202a. In an alternative refinement, the attachment device 22a can have a feed unit which is designed as a linear drive which can be coupled mechanically to the output shaft 142a of the tool basic module 10a, for example a screw drive, and is provided for using a rotational movement of the drive unit 12a of the tool basic module 10a for transporting adhesive.

In an adhesive bonding operation, a user actuates the main switch 138a arranged on the tool basic module 10a and connects the energy use unit 128a of the attachment device 22a to the energy supply 136a of the tool basic module 10a. The energy use unit 128a which is designed as an adhesive heating means heats an adhesive located in the heating region 194a of the attachment device 22a. The user actuates the operating element 202a of the attachment device 22a for transporting adhesive and thus pushes the adhesive out of the adhesive storage container 200a into the heating region 194a, as a result of which the adhesive emerges from the nozzle of the adhesive tip 198a and passes onto a body to be adhesively bonded.

FIGS. 12 to 26 show 7 further exemplary embodiments of the disclosure. The descriptions below and the drawings are essentially restricted to the differences between the exemplary embodiments, wherein, with regard to components denoted identically, in particular with regard to components with the same reference signs, reference can basically also be made to the drawings and/or the description of the other exemplary embodiments, in particular of FIGS. 1 to 11. To differentiate between the exemplary embodiments, the letter a is placed after the reference signs of the exemplary embodiments in FIGS. 1 to 11. In the exemplary embodiments of FIGS. 12 to 26, the letter a is replaced by the letters b to h.

Figure 12:
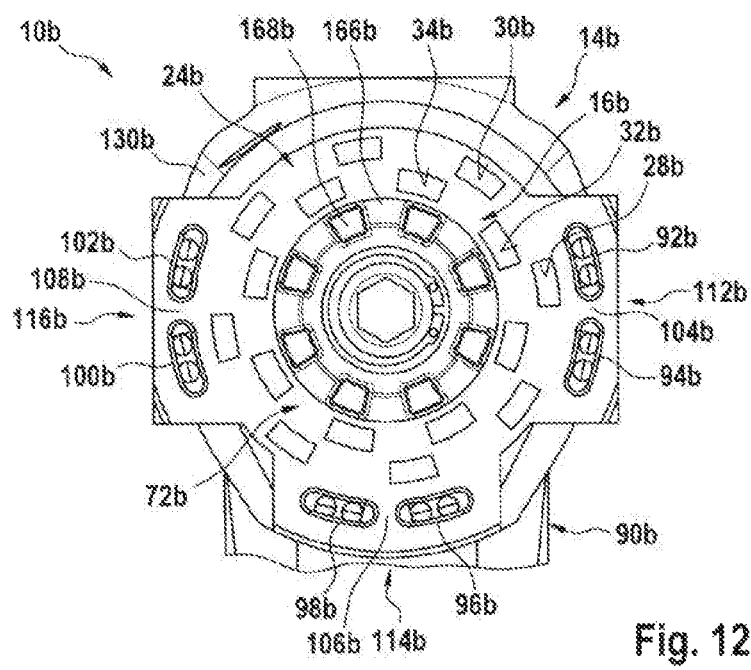
FIG. 12 shows a view of a main output of a tool basic module with a plurality of contact interfaces of an electrical interface designed as a power interface.

FIG. 12 shows a tool basic module 10b for independent use of a further exemplary embodiment. The tool basic module 10b has an energy use unit (not illustrated specifically), and a main output and a coupling device which has a mechanical interface 16b for a mechanical drive connection of at least one attachment device to the main output. The coupling device comprises an electrical interface 90b for transmitting a high power and/or a high current, said interface being provided for an electrical connection, coupled to the mechanical connection, of the at least one attachment device to the main output. The electrical interface 90b is designed as a power interface.

Analogously to the preceding exemplary embodiment, the coupling device has a further electrical interface 24b for transmitting a low power and/or a low current, said interface being provided for a further electrical connection, coupled to the mechanical connection, of the at least one attachment device to the main output. It is conceivable for the coupling device merely to comprise the electrical interface 90b, which is designed as a power interface, i.e. for the further electrical interface 24b to be omitted.

In contrast to the preceding exemplary embodiment, the interface 24b, which is designed as a power interface, has at least two contact interfaces 112b, 114b, 116b of identical type for transmitting a high current and/or a high power. Each of the contact interfaces 112b, 114b, 116b in each case comprises two plug-in elements 92b, 94b, 96b, 98b, 100b, 102b which, in at least one operating state, have a different electrical polarity. Each of the contact interfaces 112b, 114b, 116b in each case has an insulator element 104b, 106b, 108b. At least in a connected state, each of the insulator elements 104b, 106b, 108b is arranged spatially between in each case two of the plug-in elements 92b, 94b, 96b, 98b, 100b, 102b. The contact interfaces 112b, 114b, 116b are formed redundantly with respect to one another. The contact interfaces 112b, 114b, 116b are formed in a functionally equivalent manner to one another. In the present exemplary embodiment, the electrical interface 24b, which is designed as a power interface, has three contact interfaces 112b, 114b, 116b. The plug-in elements 92b, 94b, 96b, 98b, 100b, 102b of two different contact interfaces 112b, 114b, 116b are arranged offset with respect to one another in the circumferential direction. The plug-in elements 92b, 94b, 96b, 98b, 100b, 102b of two contact interfaces 112b, 114b, 116b arranged adjacent in the circumferential direction have intermediate angles of 90 degrees, 90 degrees and 180 degrees. The positions of two contact interfaces 112b, 114b, 116b merge into one another by rotation about the main output axis of the tool basic module 10b. The contact interfaces 112b, 114b, 116b are provided for electrically connecting the attachment device to the tool basic module 10b in three different angular positions with respect to the main output axis of the tool basic module 10b.

The electrical interfaces 24b, 90b have a common coupling direction. The mechanical interface 16b and the electrical interfaces 24b, 90b have a common coupling direction. Analogously to the preceding exemplary embodiment, the further electrical interface 24b has sixteen contact surfaces 28b, 30b, 32b, 34b which is arranged at least substantially in a contact plane which is arranged at least substantially perpendicularly to the coupling direction.

The coupling device of the tool basic module 10b has a locking unit 72b for locking the attachment device. The locking unit 72b is arranged at a main output 14b. The locking unit 72b is provided for locking a housing of the attachment device to a housing 130b of the tool basic module 10b. The locking unit 72b has a securing element (not illustrated specifically) for axially securing a connection of the housings 130b of the tool basic module 10b to a housing of the attachment device.

The locking unit 72b has a further securing element 166b which is provided for a rotational securing. The further securing element 166b is designed as a toothed ring and has eight teeth 168b which are arranged distributed uniformly in the circumferential direction. For the sake of clarity, only one of the teeth 168b is provided with a reference sign.

Figure 13:
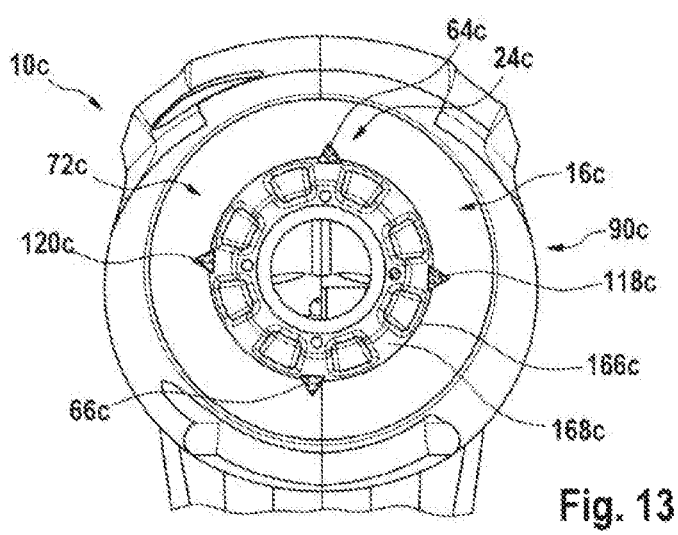
FIG. 13 shows a view of a main output of a tool basic module with electrical interfaces which are integrated in a locking unit.
Figure 14:
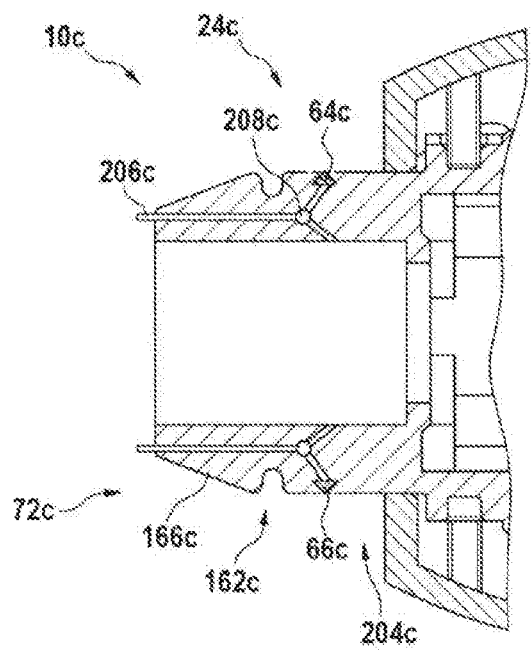
FIG. 14 shows a sectional view of the tool basic module.

FIG. 13 shows a tool basic module 10c of a further exemplary embodiment. The tool basic module 10c is provided for in particular independent use. The tool basic module 10c has an energy use unit (not illustrated specifically), and a main output and a coupling device which has a mechanical interface 16c for a mechanical drive connection of at least one attachment device to the main output. For improved clarity, an output shaft of the main output has been left out in FIG. 13. The coupling device comprises an electrical interface 90c for transmitting a high power and/or a high current, said interface being provided for an electrical connection, which is coupled to the mechanical connection, of the at least one attachment device to the main output. The electrical interface 90c is designed as a power interface.

Analogously to the preceding exemplary embodiment, the coupling device has a further electrical interface 24c for transmitting a low power and/or a low current, said interface being provided for a further electrical connection, coupled to the mechanical connection, of the at least one attachment device to the main output. It is conceivable for the coupling device merely to comprise the electrical interface 90c, which is designed as a power interface, i.e. for the further electrical interface 24c to be omitted.

Analogously to the preceding exemplary embodiments, the tool basic module 10c has a locking unit 72c for locking the attachment device. The locking unit 72c is arranged at the main output. The locking unit 72c has at least one securing element 162c for axially securing a connection of the housings (cf. FIG. 14). In the present exemplary embodiment, the securing element 162c is designed as a groove encircling in the circumferential direction. The locking unit 72c has a further securing element 166c which is provided for a rotational securing. In the present exemplary embodiment, the further securing element 166c is formed integrally with the housing of the tool basic module 10c. The further securing element 166c is designed as a toothed ring and has eight teeth 168c which are arranged distributed uniformly in the circumferential direction. For the sake of clarity, only one of the teeth 168c is provided with a reference sign.

The electrical interface 90c, which is designed as a power interface, and the further electrical interface 24c are integrated in the locking unit 72c. In contrast to the preceding exemplary embodiments, the electrical interface 90c, which is designed as a power interface, and the further electrical interface 90c have contact elements 64c, 66c, 118c, 120c formed analogously to one another. The contact elements 64c, 66c, 118c, 120c are each arranged on an outer circumference on a base portion 204c of the locking unit 72c. Contact elements 64c, 66c, 118c, 120c arranged adjacent to one another in the circumferential direction have an intermediate angle of at least substantially 90 degrees with respect to a main output axis of the main output. The contact elements 118c, 120c of the electrical interface 90c, which is designed as a power interface, are arranged lying opposite each other. The contact elements 64c, 66c of the further electrical interface 90c are arranged lying opposite each other. Only one of the contact elements 64c is described in more detail below. The contact element 64c comprises a pin 206c mounted in an axially movable manner in the further securing element 166c. In an uncoupled state, the pin 206c projects beyond an end side of the securing element 166c. The pin 206c is provided to be displaced during a coupling operation. The contact point has a joint 208c which connects the pin 206c to a contact surface of the contact element 64c and which is provided to convert an axial movement of the pin into a radial movement of the contact surface outward.

Figure 15:
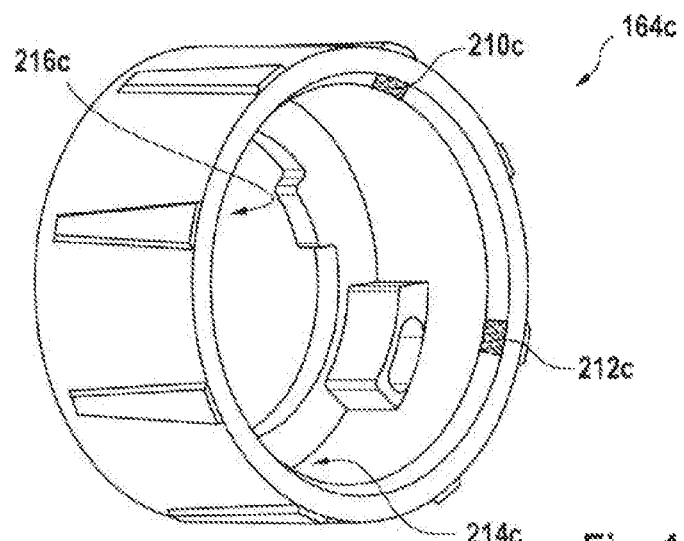
FIG. 15 shows a perspective view of an unlocking ring of an attachment device complementary to the tool basic module.

FIG. 15 shows an unlocking ring 164c of the attachment device. Contact elements 210c, 212c, 214c, 216c corresponding to the contact elements 64c, 66c, 118c, 120c are arranged on the unlocking ring 164c. The contact elements 210c, 212c, 214c, 216c of the attachment device are arranged distributed in the circumferential direction in a manner corresponding to the contact elements 64c, 66c, 118c, 120c of the electrical interface 90c. The contact elements 210c, 212c, 214c, 216c of the unlocking ring 164c come into contact with the contact surfaces of the contact elements 64c, 66c, 118c, 120c during the coupling movement. It is also conceivable for the contact elements 64c, 66c, 118c, 120c to all be assigned to a single electrical interface 24c, 90c and to permit a connection of the attachment device in two different angular positions. In the present exemplary embodiment, an axial contact region of the electrical interfaces 24c, 90c is arranged spatially in the axial direction between the axial securing element 162c and a tool holder of the tool basic module 10c.

Figure 16:
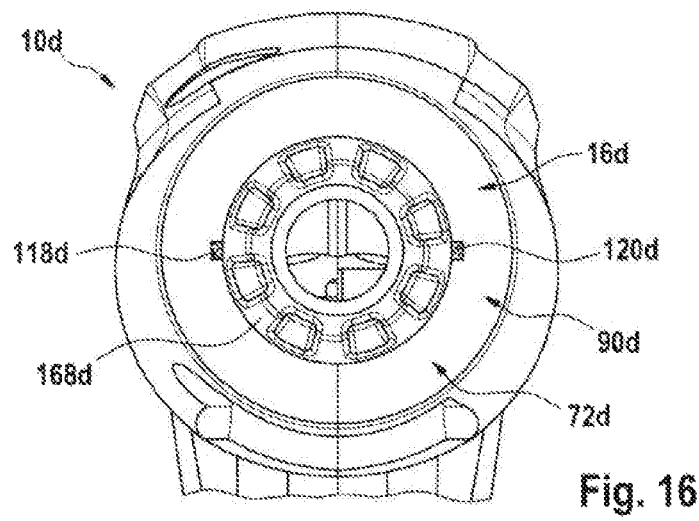
FIG. 16 shows a view of a main output of a tool basic module with contact elements in a base portion of a locking unit.
Figure 17:
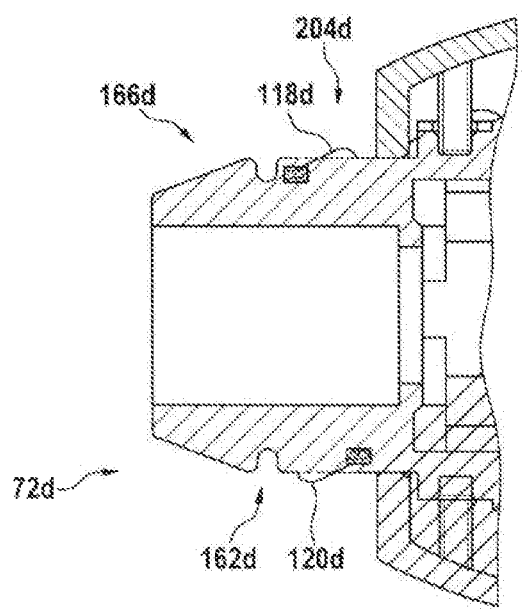
FIG. 17 shows a sectional view of the tool basic module.

FIG. 16 shows a tool basic module 10d of a further exemplary embodiment. The tool basic module 10d is provided for in particular independent use. The tool basic module 10d has an energy use unit (not illustrated specifically), and also a main output and a coupling device which has a mechanical interface 16d for a mechanical drive connection of at least one attachment device to the main output. For improved clarity, an output shaft of the main output has been left out in FIG. 16. The coupling device comprises an electrical interface 90d for transmitting a high power and/or a high current, said interface being provided for an electrical connection, coupled to the mechanical connection, of the at least one attachment device to the main output. The electrical interface 90d is designed as a power interface. In the present exemplary embodiment, the tool basic module 10d does not have any further electrical interface. It is also conceivable for the electrical interface 90d to be provided as an interface for transmitting a low power and/or a low current.

Analogously to the previous exemplary embodiments, the tool basic module 10d has a locking unit 72d for locking the attachment device. The locking unit 72d is arranged at the main output. The locking unit 72d has at least one securing element 162d for an axial securing of a connection of the housings. In the present exemplary embodiment, the securing element 162d is designed as a groove encircling in the circumferential direction (cf. FIG. 17). The locking unit 72d has a further securing element 166d which is provided for a rotational securing.

In the present exemplary embodiment, the further securing element 166d is formed integrally with the housing of the tool basic module 10d. The further securing element 166d is designed as a toothed ring and has eight teeth 168d which are arranged distributed uniformly in the circumferential direction. For the sake of clarity, only one of the teeth 168d is provided with a reference sign.

The electrical interface 90d, which is designed as a power interface, is integrated in the locking unit 72d. The electrical interface 90d has two contact elements 118d, 120d. The contact elements 118d, 120d are each arranged on an outer circumference on a base portion 204d of the locking unit 72d. In contrast to the preceding exemplary embodiments, the contact elements 118d, 120d are arranged offset axially with respect to one another. The contact elements 118d, 120d are each designed as a spring contact element.

Figure 18:
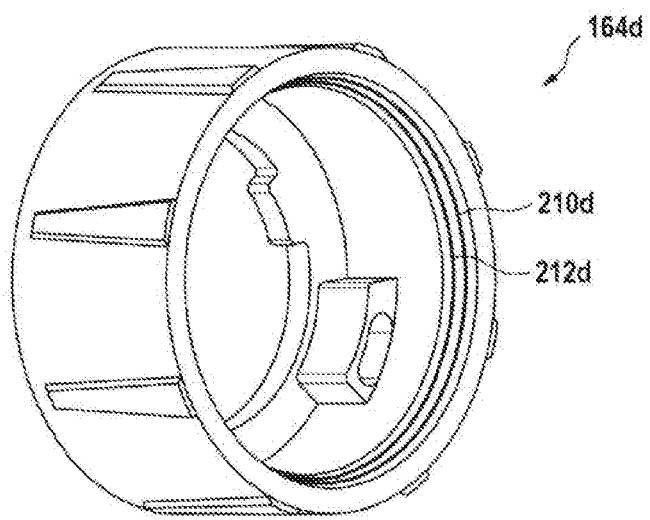
FIG. 18 shows a perspective view of an unlocking ring of an attachment device complementary to the tool basic module.

Analogously to the preceding exemplary embodiments, the attachment device has an unlocking ring 164d which has contact elements 210d, 212d corresponding to the contact elements 118d, 120d (cf. FIG. 18). The contact elements 210d, 212d each have an annular contact surface. The contact elements 210d, 212d are arranged offset axially with respect to one another in a manner corresponding to the contact elements 118d, 120d of the electrical interface 90d. The contact elements 210d, 212d of the unlocking ring 164d come into contact with contact surfaces of the contact elements 118d, 120d of the electrical interface 90d during the coupling movement. In an alternative refinement, it is conceivable for the locking unit 74d to have, on the base portion 204d, a thread in which the contact elements are integrated. In such a refinement, the unlocking ring has a correspondingly designed thread in which contact elements of the attachment device are integrated.

Figure 19:
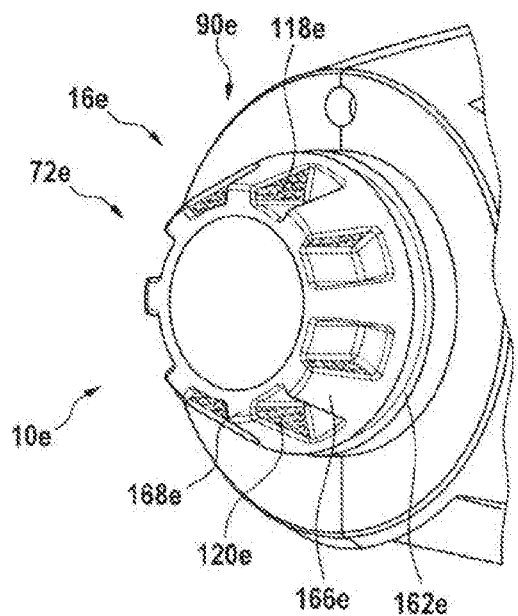
FIG. 19 shows a view of a main output of a tool basic module with contact elements at teeth of a locking unit.

FIG. 19 shows a tool basic module 10e of a further exemplary embodiment. The tool basic module 10e is provided for in particular independent use. The tool basic module 10e has an energy use unit (not illustrated specifically), and a main output and a coupling device which has a mechanical interface 16e for a mechanical drive connection of at least one attachment device 18e to the main output. For improved clarity, an output shaft of the main output has been left out in FIG. 19. The coupling device comprises an electrical interface 90e for transmitting a high power and/or a high current, said interface being provided for an electrical connection, coupled to the mechanical connection, of the at least one attachment device 18e to the main output. The electrical interface 90e is designed as a power interface. In the present exemplary embodiment, the tool basic module 10e does not have any further electrical interface. It is also conceivable for the electrical interface to be provided as an interface for transmitting a low power and/or a low current.

Analogously to the preceding exemplary embodiments, the tool basic module 10e has a locking unit 72e for locking the attachment device 18e. The locking unit 72e is arranged at the main output. The locking unit 72e has an axial securing element 162e. The locking unit 72e has a further securing element 166e which is provided for a rotational securing. In the present exemplary embodiment, the further securing element 166e is formed integrally with the housing of the tool basic module 10e. The further securing element 166e is designed as a toothed ring and has eight teeth 168e which are arranged distributed uniformly in the circumferential direction. For the sake of clarity, only one of the teeth 168e is provided with a reference sign.

The electrical interface 90e, which is designed as a power interface, is integrated in the locking unit 72e. The electrical interface 90e has sixteen contact elements 118e, 120e which each have a contact surface. For a better overview, only two of the contact elements 118e, 120e are provided with a reference sign. It is also conceivable for the electrical interface 90e to have eight contact elements 118e, 120e which each have two contact surfaces. The contact surfaces are in each case arranged on surfaces, oriented in the circumferential direction, of the teeth 168e of the securing element 166e. The contact surfaces are oriented in the direction of intermediate spaces arranged between the teeth 168e. Contact surfaces which, in at least one operating state, have an identical first polarity are arranged in an angular portion of 180 degrees with respect to a main output axis of the main output. Contact surfaces which, in at least one operating state, have an identical polarity different from the first polarity are arranged in an angular portion complementary to the first angular portion. Other distributions of the polarities are also conceivable; for example, contact surfaces provided for a different polarity can be arranged in an alternating manner in the circumferential direction.

Figure 20:
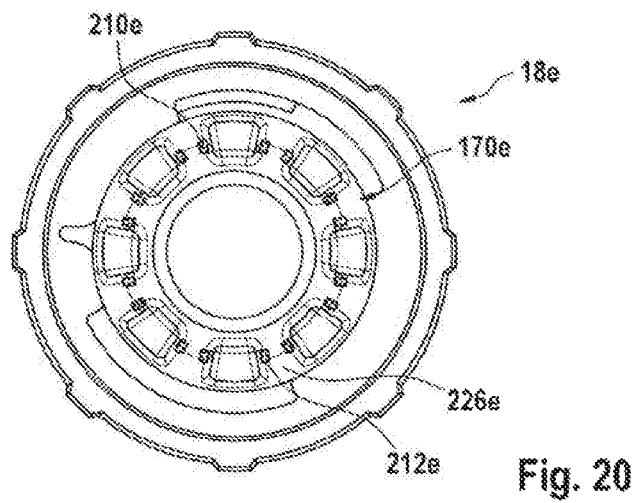
FIG. 20 shows a view of a holder of an attachment device complementary to the tool basic module.

The attachment device 18e has a holder 170e which is designed in a manner corresponding to the further securing element 166e and has eight mating teeth 226e (cf. FIG. 20). In a coupled state, the further securing element 166e engages in the holder 170e of the attachment device 18e. In the present exemplary embodiment, the attachment device 18e has sixteen contact elements 210e, 212e which are designed in a manner corresponding to the contact elements 118e, 120e and are arranged on surfaces, oriented in the circumferential direction, of the mating teeth 226e. In a coupled state, in each case one contact element 118e, 120e of the electrical interface 90e is in contact with in each case one contact element 210e, 212e of the attachment device 18e. It is conceivable for the attachment device 18e in an alternative refinement to have a smaller number of contact elements, for example four contact elements. In such a refinement, the electrical interface permits connection of the attachment device 18e in a plurality of angular positions.

Figure 21:
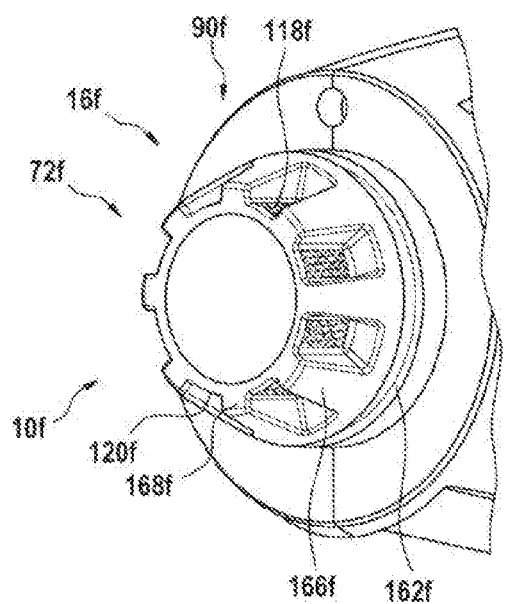
FIG. 21 shows a view of a main output of a tool basic module with contact elements between teeth of a locking unit.

FIG. 21 shows a tool basic module 10f of a further exemplary embodiment. The tool basic module 10f is provided for in particular independent use. The tool basic module 10f has an energy use unit (not illustrated specifically), and a main output and a coupling device which has a mechanical interface 16f for a mechanical drive connection of at least one attachment device 18f to the main output. For an improved overview, an output shaft of the main output has been left out in FIG. 21. The coupling device comprises an electrical interface 90f for transmitting a high power and/or a high current, said interface being provided for an electrical connection, coupled to the mechanical connection, of the at least one attachment device 18f to the main output. The electrical interface 90f is designed as a power interface. In the present exemplary embodiment, the tool basic module 10f does not have any further electrical interface. It is also conceivable for the electrical interface 90f to be provided as an interface for transmitting a low power and/or a low current.

Analogously to the preceding exemplary embodiments, the tool basic module 10f has a locking unit 72f for locking the attachment device 18f. The locking unit 72f is arranged at the main output. The locking unit 72f has an axial securing element 162f. The locking unit 72f has a further securing element 166f which is provided for a rotational securing. In the present exemplary embodiment, the securing element 166f is formed integrally with the housing of the tool basic module 10f. The further securing element 166f is designed as a toothed ring and has eight teeth 168f which are arranged distributed uniformly in the circumferential direction.

The electrical interface 90f, which is designed as a power interface, is integrated in the locking unit 72f. The electrical interface 90f has eight contact elements 118f, 120f which each have a contact surface. The contact surfaces are each arranged on radially outwardly oriented surfaces in intermediate spaces between the teeth 168f of the securing element 166f. Contact surfaces which, in at least one operating state, have an identical first polarity are arranged in an angular portion of 180 degrees with respect to a main output axis of the main output. Contact surfaces which, in at least one operating state, have an identical polarity different from the first polarity are arranged in an angular portion which is complementary with respect to the angular portion. Other distributions of the polarities are also conceivable; for example, contact surfaces provided for different polarities can be arranged in an alternating manner in the circumferential direction.

Figure 22:
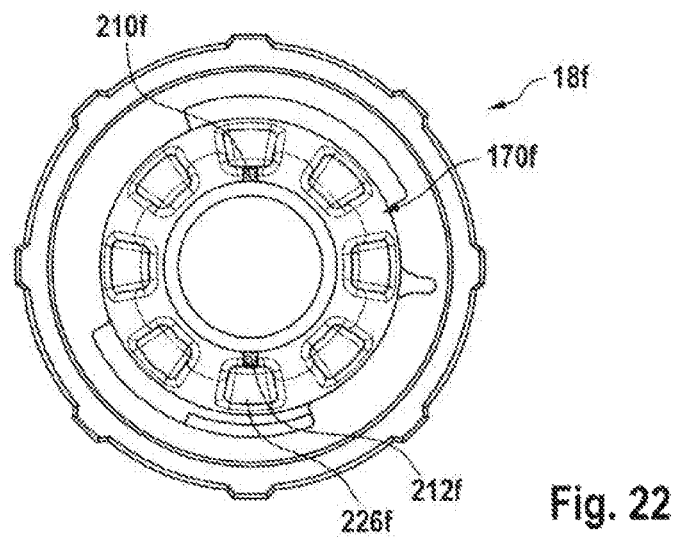
FIG. 22 shows a view of a holder of an attachment device complementary to the tool basic module.

The attachment device 18f has a holder 170f which is designed in a manner corresponding to the further securing element 166f and has eight mating teeth 226f (cf. FIG. 22). In a coupled state, the further securing element 166f engages in the holder 170f of the attachment device 18f. In the present exemplary embodiment, the attachment device 18f has two contact elements 210f, 212f which are designed in a manner corresponding to the contact elements 118f, 120f and are arranged on radially inwardly directed surfaces of the mating teeth 226f. The contact elements 210f, 212f are designed as spring contact elements. In a coupled state, the contact elements 210f, 212f of the attachment device 18f are in each case in contact with a contact element 118f, 120f of the electrical interface 90f. The interface 90f is provided for a connection of the attachment device 18f in one of four different angular positions. It is conceivable for the attachment device 18f in an alternative refinement to have a number of contact elements differing from four.

Figure 23:
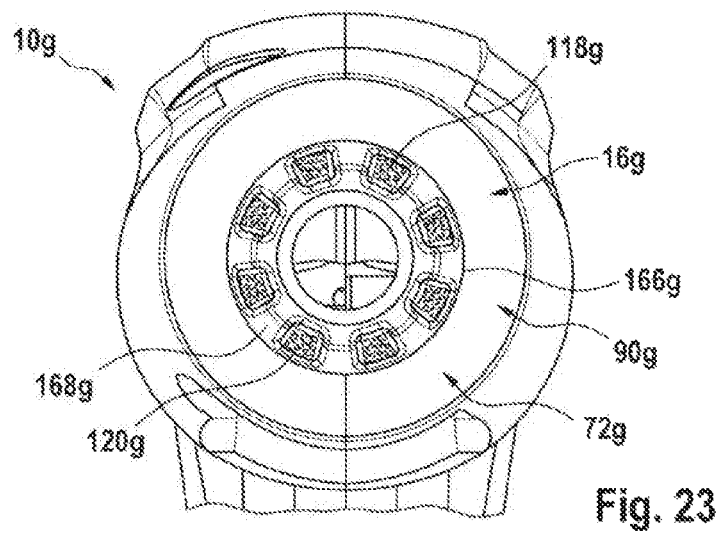
FIG. 23 shows a view of a main output of a tool basic module with contact elements on the end side between teeth of a locking unit.

FIG. 23 shows a tool basic module 10g of a further exemplary embodiment. The tool basic module 10g is provided for in particular independent use. The tool basic module 10g has an energy use unit (not illustrated specifically), and a main output and a coupling device which has a mechanical interface 16g for a mechanical drive connection of at least one attachment device 18g to the main output. For an improved overview, an output shaft of the main output has been left out in FIG. 23. The coupling device comprises an electrical interface 90g for transmitting a high power and/or a high current, said interface being provided for an electrical connection, coupled to the mechanical connection, of the at least one attachment device 18g to the main output. The electrical interface 90g is designed as a power interface. In the present exemplary embodiment, the tool basic module 10g does not have any further electrical interface. It is also conceivable for the electrical interface to be provided as an interface for transmitting a low power and/or a low current.

Analogously to the previous exemplary embodiments, the tool basic module 10g has a locking unit 72g for locking the attachment device 18g. The locking unit 72g is arranged at the main output. The locking unit 72g has a securing element 166g which is provided for a rotational securing. In the present exemplary embodiment, the securing element 166g is formed integrally with the housing of the tool basic module 10g. The securing element 166g is designed as a toothed ring and has eight teeth 168g which are arranged distributed uniformly in the circumferential direction.

The electrical interface 90g, which is designed as a power interface, is integrated in the locking unit 72g. The electrical interface 90g has eight contact elements 118g, 120g which each have a contact surface. The contact surfaces are each arranged on surfaces, which are oriented axially in a main working direction of the tool basic module 10g, in intermediate spaces between the teeth 168g of the securing element 166g. Contact surfaces which, in at least one operating state, have an identical first polarity are arranged in an angular portion of 180 degrees with respect to a main output axis of the main output. Contact surfaces which, in at least one operating state, have an identical polarity different from the first polarity are arranged in an angular portion which is complementary with respect to the angular portion. Other distributions of the polarities are also conceivable; for example, contact surfaces provided for different polarities can be arranged in an alternating manner in the circumferential direction.

Figure 24:
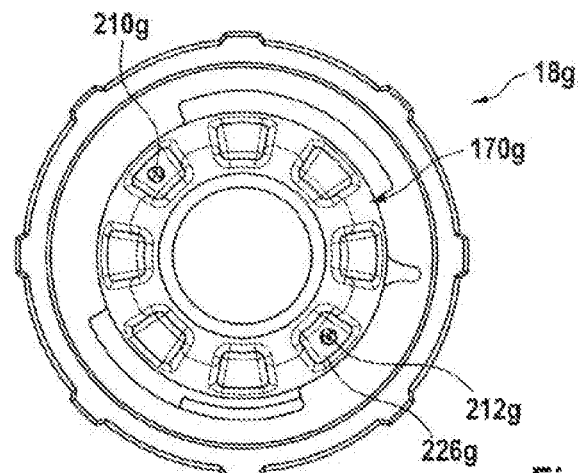
FIG. 24 shows a view of a holder of an attachment device complementary to the tool basic module.

The attachment device 18g has a holder 170g which is designed in a manner corresponding to the further securing element 166g and has eight mating teeth 226g (cf. FIG. 24). In a coupled state, the further securing element 166g engages in the holder 170g of the attachment device 18g. In the present exemplary embodiment, the attachment device 18g has two contact elements 210g, 212g which are designed in a manner corresponding to the contact elements 118g, 120g and are arranged on axially directed end surfaces of the mating teeth 226g. The contact elements 210g, 212g each have a pin mounted in a spring-loaded manner. In a coupled state, the contact elements 210g, 212g of the attachment device 18g are each in contact with a contact element 118g, 120g of the electrical interface 90g. The interface 90g is provided for a connection of the attachment device 18g in one of four different angular positions. It is conceivable for the attachment device 18g in an alternative refinement to have a number of contact elements differing from four. It is furthermore conceivable for the tool basic module 10g in an alternative refinement to have a further electrical interface. In such a refinement, the contact elements are each assigned to one of the interfaces.

Figure 25:
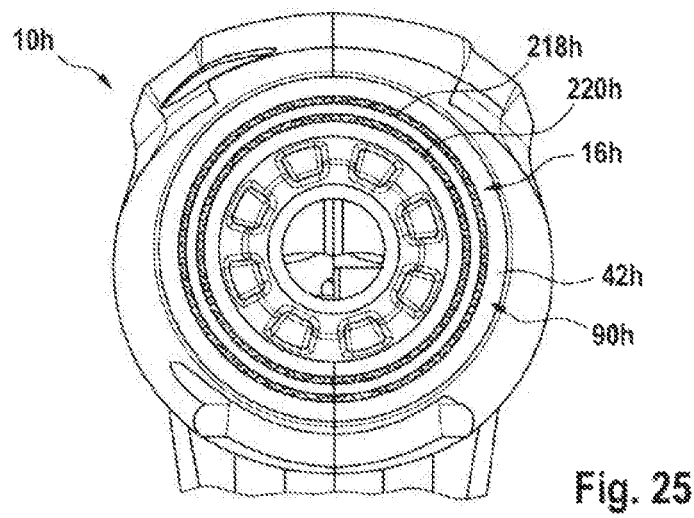
FIG. 25 shows a view of a main output of a tool basic module with annular contact elements.
Figure 26:
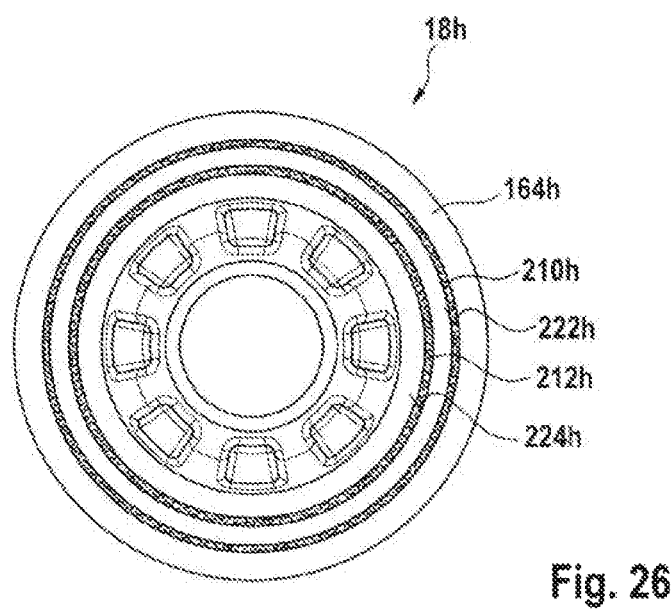
FIG. 26 shows a view of a holder of an attachment device complementary to the tool basic module.

FIG. 25 shows a tool basic module 10h of a further exemplary embodiment. The tool basic module 10h is provided for in particular independent use. The tool basic module 10h has an energy use unit (not illustrated specifically), and a main output and a coupling device which has a mechanical interface 16h for a mechanical drive connection of at least one attachment device 18h to the main output. For an improved overview, an output shaft of the main output has been left out in FIG. 25. The coupling device has an electrical interface 90h for transmitting a high power and/or a high current, said interface being provided for an electrical connection, coupled to the mechanical connection, of the at least one attachment device 18h to the main output. The electrical interface 90h is designed as a power interface. In the present exemplary embodiment, the tool basic module 10h does not have any further electrical interface. It is also conceivable for the electrical interface to be provided as an interface for transmitting a low power and/or a low current.

The electrical interface 90h has a coupling direction. The main output has a main output axis. The electrical interface 90h has at least one contact surface 218h, 220h which is arranged at least substantially in a contact plane which is arranged at least substantially perpendicularly to the coupling direction. The contact surface 218h, 220h is designed to be at least substantially flat. The electrical interface 90h of the tool basic module 10h has a plurality of contact surfaces 218h, 220h. In the present exemplary embodiment, the electrical interface 90h of the tool basic module 10h has two contact surfaces 218h, 220h. The contact surfaces 218h, 220h of the electrical interface 90h are all designed to be at least substantially flat and are arranged in the contact plane. In contrast to the preceding exemplary embodiments, the contact surfaces 218h, 220h are of annular design. In at least one operating state, the contact surfaces 218h, 220h have a different polarity. The contact surfaces 218h, 220h are arranged concentrically with respect to each other. The contact surfaces 218h, 220h are arranged concentrically about a main output axis of the main output. The contact surfaces 218h, 220h have different diameters.

The coupling device has at least one at least partially disk-shaped support element 42h with an end surface on which the at least one contact surface 218h, 220h is arranged. All of the contact surfaces 218h, 220h of the electrical interface 90h are arranged on the end surface. In a mounted state, the support element 42h is connected fixedly and immovably to the housing of the tool basic module 10h. The support element 42h is designed in the shape of a circular ring. It has a disk plane which defines the direction of a contact plane of the electrical interface 90h. The end surface of the support element 42h, on which the contact surfaces 218h, 220h of the electrical interface 90h are arranged, has the abutment surface of the coupling device for the attachment device 18h.

The attachment device 18h has an unlocking ring 164h which has contact elements 210h, 212h corresponding to the contact surfaces 218h, 220h. The contact elements 210h, 212h each have contact surfaces 222h, 224h of annular design. The contact elements 210h, 212h are of elastic design and have a wavy structure in the axial direction. The contact elements 210h, 212h are arranged concentrically with respect to each other in a manner corresponding to the contact surfaces 218h, 220h of the electrical interface 90h. The contact elements 210h, 212h of the unlocking ring 164h come into contact with contact surfaces 218h, 220h of the electrical interface 90h during the coupling movement. It is conceivable for the electrical interface 90h to have contact surfaces which are at least substantially of rectangular design and are arranged at different distances from the main output axis of the main output. It is furthermore conceivable for the support element 42h in an alternative refinement to have annular depressions in which the contact surfaces of the electrical interface are arranged. In such a refinement, the unlocking ring has pin- or tongue-shaped contact elements which, in at least one connected state, engage in the annular depressions of the support element.

The invention claimed is:
1. A tool basic module, comprising:
a housing;
a drive unit located in the housing;
a gearing unit located in the housing and operably connected to the drive unit;
a main output at least partially located in the housing and operably connected to the gearing unit, wherein the gearing unit is configured to lower a rotational speed of the main output as compared with a rotational speed of the drive unit; and
a coupling device mounted on the housing and configured to couple to at least one attachment device in a coupled state, the coupling device including:
a mechanical interface configured to form a mechanical drive connection between the at least one attachment device and the main output in the coupled state, and
an electrical interface configured to form an electrical connection for the transmission of electrical energy between the at least one attachment device and the tool basic module in the coupled state,
wherein the electrical interface has at least one contact element that has a contact surface, and that is configured to perform a cleaning movement to clean the contact surface.

2. The tool basic module as claimed in claim 1, wherein the electrical interface is further configured to transmit a high power of at least 20 W and/or a high current of at least 2 A to the at least one attachment device in the coupled state.

3. The tool basic module as claimed in claim 1, wherein, in the coupled state, the electrical interface has an electrical resistance of at most 15 mΩ.

4. The tool basic module as claimed in claim 1, wherein the electrical interface has at least two contact interfaces of a same type.

5. The tool basic module as claimed in claim 1, wherein the electrical interface has at least one contact element which, in the coupled state, is biased against a contact surface of the at least one contact element with a pressing force of at least 4 N.

6. The tool basic model as claimed in claim 1, wherein the cleaning movement is an abrading movement.

7. The tool basic module as claimed in claim 1, wherein the at least two plug-in elements are configured as tulip-shaped plugs.

8. The tool basic module as claimed in claim 1, wherein:
the electrical interface has at least two plug-in elements and at least one insulating element, and
at least in the coupled state, the at least one insulating element is positioned spatially between the at least two plug-in elements.

9. A tool basic module, comprising:
a housing;
a drive unit located in the housing;
a gearing unit located in the housing and operably connected to the drive unit;
a main output at least partially located in the housing and operably connected to the gearing unit, wherein the gearing unit is configured to lower a rotational speed of the main output as compared with a rotational speed of the drive unit; and
a coupling device mounted on the housing and configured to couple to at least one attachment device in a coupled state, the coupling device including:
a mechanical interface configured to form a mechanical drive connection between the at least one attachment device and the main output in the coupled state, and
an electrical interface configured to form an electrical connection for the transmission of electrical energy between the at least one attachment device and the tool basic module in the coupled state,
wherein the coupling device further includes at least one further electrical interface configured (i) to transmit electrical energy in the coupled state, and (ii) to close at least one current circuit in the coupled state,
wherein the at least one current circuit is independent of the electrical interface,
wherein the electrical interface is configured for only the transmission of high power electrical energy of at least 20 W, and
wherein the at least one further electrical interface is configured for only the transmission of low power electrical energy of less than 4 W.

10. The tool basic module as claimed in claim 9, further comprising:
at least one unit that is at least one of a control and a regulating unit, and that is configured to evaluate at least one value of a characteristic variable of the at least one attachment device,
wherein the at least one further electrical interface is configured to transmit the at least one value.

11. The tool basic module as claimed in claim 10, wherein the characteristic variable is in the form of a coding resistance.

12. The tool basic module at least as claimed in claim 10, wherein in at least one operating state, the at least one unit at least one of controls and regulates at least one of a current supply of the drive unit, a current supply of the electrical interface, and a current supply of the at least one further electrical interface depending on the at least one value of the characteristic variable.

13. An attachment device for a tool basic module including a drive unit, the attachment device comprising:
a working output;
a main input;
a coupling device including:
a mechanical interface configured to form a mechanical drive connection between the main input of the attachment device and a main output of the tool basic module in a coupled state, the main output operably connected to the drive unit of the tool basic module, and
an electrical interface configured to transmit electrical energy, and further configured to form an electrical connection between the attachment device and the tool basic module in the coupled state; and
at least one electrical energy use unit with a maximum power consumption corresponding to at least 50% of a maximum power consumption of the drive unit of the tool basic module.

14. The attachment device as claimed in claim 13, wherein the tool basic module is a part of a portable power tool system.

15. The attachment device as claimed in claim 13, wherein:
the electrical interface comprises at least two plug-in elements, and
the at least two plug-in elements are configured as pins or blades.

16. The attachment device as claimed in claim 15, further comprising:
a housing configured to support the working output, the main input, and the coupling device,
wherein the coupling device comprises a mechanical protective element configured to protect the at least two plug-in elements, and
wherein the mechanical protective element extends from the housing as a housing projection.

17. A portable power tool system, comprising:
a tool basic module, including:
a housing;
a drive unit located in the housing;
a gearing unit located in the housing and operably connected to the drive unit;
a main output at least partially located in the housing and operably connected to the gearing unit, wherein the gearing unit is configured to lower a rotational speed of the main output as compared with a rotational speed of the drive unit; and
a first coupling device mounted on the housing and including a first mechanical interface and a first electrical interface; and
at least one attachment device configured to form a mechanical drive connection and an electrical drive connection to the tool basic module, the at least one attachment device including:
a working output;
a main input operably connected to the working output; and
a second coupling device including a second mechanical interface and a second electrical interface;
wherein the first and second mechanical interfaces are configured to form the mechanical drive connection between the main input of at least one attachment device and the main output of the tool basic module in a coupled state of the first coupling device and the second coupling device; and wherein the first and second electrical interfaces are configured to transmit electrical energy, and further configured to form the electrical drive connection between the at least one attachment device and the tool basic module in the coupled state.

18. The portable power tool system as claimed in claim 17, wherein the second coupling device of the at least one attachment device further includes a third electrical interface that, together with a fourth electrical interface of the first coupling device of the tool basic module, is configured to form another electrical connection.

19. The portable power tool system as claimed in claim 18, wherein the attachment device further includes at least one electrical energy use unit with a maximum power consumption which corresponds to at least 50% of a maximum power consumption of the drive unit of the tool basic module.

20. A method of using the portable power tool system of claim 17 that includes connecting the at least one attachment device to the tool basic module such that:

the first and second mechanical interfaces of the first and second coupling devices form the mechanical drive connection between the main input of at least one attachment device and the main output of the tool basic module; and the first and second electrical interfaces of the first and second coupling devices form the electrical drive connection between the at least one attachment device and the tool basic module.

21. The portable power tool system as claimed in claim 17, wherein the first and second electrical interfaces are configured to transmit a high power of at least 20 W and/or a high current of at least 2 A.

* * * * *